United States Patent
Hamada

(10) Patent No.: US 10,089,364 B2
(45) Date of Patent: Oct. 2, 2018

(54) ITEM RECOMMENDATION DEVICE, ITEM RECOMMENDATION METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Shinichiro Hamada, Kanagawa (JP)

(73) Assignees: KABUSHIKI KAISHA TOSHIBA, Tokyo (JP); TOSHIBA SOLUTIONS CORPORATION, Kawasaki-Shi (JP)

(*) Notice: Subject to any disclaimer, the term of this patent is extended or adjusted under 35 U.S.C. 154(b) by 435 days.

(21) Appl. No.: 14/926,219

(22) Filed: Oct. 29, 2015

(65) Prior Publication Data

US 2016/0125048 A1 May 5, 2016

(30) Foreign Application Priority Data

Oct. 31, 2014 (JP) .................................. 2014-223222
Mar. 13, 2015 (JP) .................................. 2015-050664

(51) Int. Cl.
*G06F 17/30* (2006.01)
(52) U.S. Cl.
CPC .... *G06F 17/3053* (2013.01); *G06F 17/30401* (2013.01); *G06F 17/30528* (2013.01)
(58) Field of Classification Search
CPC ................. G06F 17/28; G06F 17/2785; G06F 17/30654; G06F 17/30684; G06F 17/30864; G06F 17/3064; G06F 17/30696; G06F 17/30867; G06F 17/30401; G06F 17/30554
See application file for complete search history.

(56) References Cited

U.S. PATENT DOCUMENTS

| | | | |
|---|---|---|---|
| 2002/0025079 A1* | 2/2002 | Kuwata | H04N 1/40062 382/254 |
| 2005/0228868 A1 | 10/2005 | Kawamichi et al. | |
| 2011/0293148 A1 | 12/2011 | Kobayashi | |

(Continued)

FOREIGN PATENT DOCUMENTS

| | | |
|---|---|---|
| JP | 2002-288187 | 10/2002 |
| JP | 2005-300965 | 10/2005 |

(Continued)

OTHER PUBLICATIONS

Socher, et al. "Semantic Compositionality through Recursive Matrix-Vector Spaces", Conference on Empirical Methods in Natural Language Processing. 2012.

(Continued)

*Primary Examiner* — Yuk Ting Choi
(74) *Attorney, Agent, or Firm* — Amin, Turocy & Watson LLP

(57) ABSTRACT

An item recommendation device includes a context information generator and a ranker. The context information generator generates and outputs context information including user intention by performing semantic analysis on a natural language request which is input. The ranker ranks candidates of items to be presented to a user based on the context information, user information representing an attribute of the user, and history information representing item usage history of the user.

7 Claims, 16 Drawing Sheets

101

| SEARCH TAG | APPLICATION DESTINATION ATTRIBUTE | TRIGGER WORD |
|---|---|---|
| JAPANESE-STYLE BAR | CATEGORY NAME | ALCOHOLIC BEVERAGE, DRINKING PARTY, DINING, BANQUET, FAREWELL PARTY |
| CAFE | CATEGORY NAME | TEA, CAKE, LITTLE BIT HUNGRY, MEETING, WAITING TIME |
| FLORIST SHOP | CATEGORY NAME | THANK-YOU PARTY, GIFT, ANNIVERSARY |
| INEXPENSIVE | OTHER ATTRIBUTES | REASONABLE |
| ⋮ | ⋮ | ⋮ |

(56) References Cited

U.S. PATENT DOCUMENTS

| | | | | |
|---|---|---|---|---|
| 2012/0016678 A1* | 1/2012 | Gruber | ............... | G06F 17/3087 |
| | | | | 704/275 |
| 2012/0293686 A1* | 11/2012 | Karn | ..................... | G11B 27/00 |
| | | | | 348/231.3 |
| 2013/0262588 A1* | 10/2013 | Barak | .................... | H04L 67/22 |
| | | | | 709/204 |

FOREIGN PATENT DOCUMENTS

| | | |
|---|---|---|
| JP | 2011-248548 | 12/2011 |
| JP | 2012-14603 | 1/2012 |
| JP | 2012-94196 | 5/2012 |
| JP | 2013-109051 | 6/2013 |
| JP | 2015-179441 | 10/2015 |
| JP | 2017-049910 | 3/2017 |

OTHER PUBLICATIONS

Mikolov, et al. "Recurrent neural network based language model", Interspeech 2010.

Socher, et al. "Dynamic Pooling and Unfolding Recursive Autoencoders for Paraphrase Detection", Advances in Neural Information Processing Systems. 2011.

Kai, et al. "Speech Detection from Extraction and Recognition of Lip Area", IPSJ SIG Technical Report, vol. 2011-CVIM-177 No. 13, May 19, 2011.

Yize Li, et al. "Contextual recommendation based on Text Mining", Proceedings of the 23rd International Conference on Computational Linguistics, Association for Computational Linguistics, Coling 2010: Poster Volume, pp. 692-700, Beijing, Aug. 2010.

\* cited by examiner

| STORE ID | STORE NAME | CATEGORY NAME | OTHER ATTRIBUTES |
|---|---|---|---|
| 1 | WAIWAIYA | JAPANESE-STYLE BAR | INEXPENSIVE, ALL-YOU-CAN-EAT TYPE, VIBRANT, OPEN ON WEEKENDS, ⋯ |
| 2 | WAFUU HONPO | JAPANESE-STYLE BAR | HEALTHY, SPECIALTY DISH, PRIVATE DINING ROOM, OPEN ON WEEKENDS, ⋯ |
| 3 | RIVIERA | CAFE | LUNCH MENU, ⋯ |
| ⋮ | ⋮ | ⋮ | ⋮ |

FIG.3

TAGS RELATED TO STORE NAMES : WAIWAIYA, WAFUU HONPO, RIVIERA, ⋯

TAGS RELATED TO CATEGORY NAMES : JAPANESE-STYLE BAR, CAFE, BOOKSTORE, AMUSEMENT PARK, ⋯

TAGS RELATED TO OTHER ATTRIBUTES : INEXPENSIVE, ALL-YOU-CAN-EAT TYPE, VIBRANT, ⋯

| SEARCH TAG | APPLICATION DESTINATION ATTRIBUTE | TRIGGER WORD |
|---|---|---|
| JAPANESE-STYLE BAR | CATEGORY NAME | ALCOHOLIC BEVERAGE, DRINKING PARTY, DINING, BANQUET, FAREWELL PARTY |
| CAFE | CATEGORY NAME | TEA, CAKE, LITTLE BIT HUNGRY, MEETING, WAITING TIME |
| FLORIST SHOP | CATEGORY NAME | THANK-YOU PARTY, GIFT, ANNIVERSARY |
| INEXPENSIVE | OTHER ATTRIBUTES | REASONABLE |
| ⋮ | ⋮ | ⋮ |

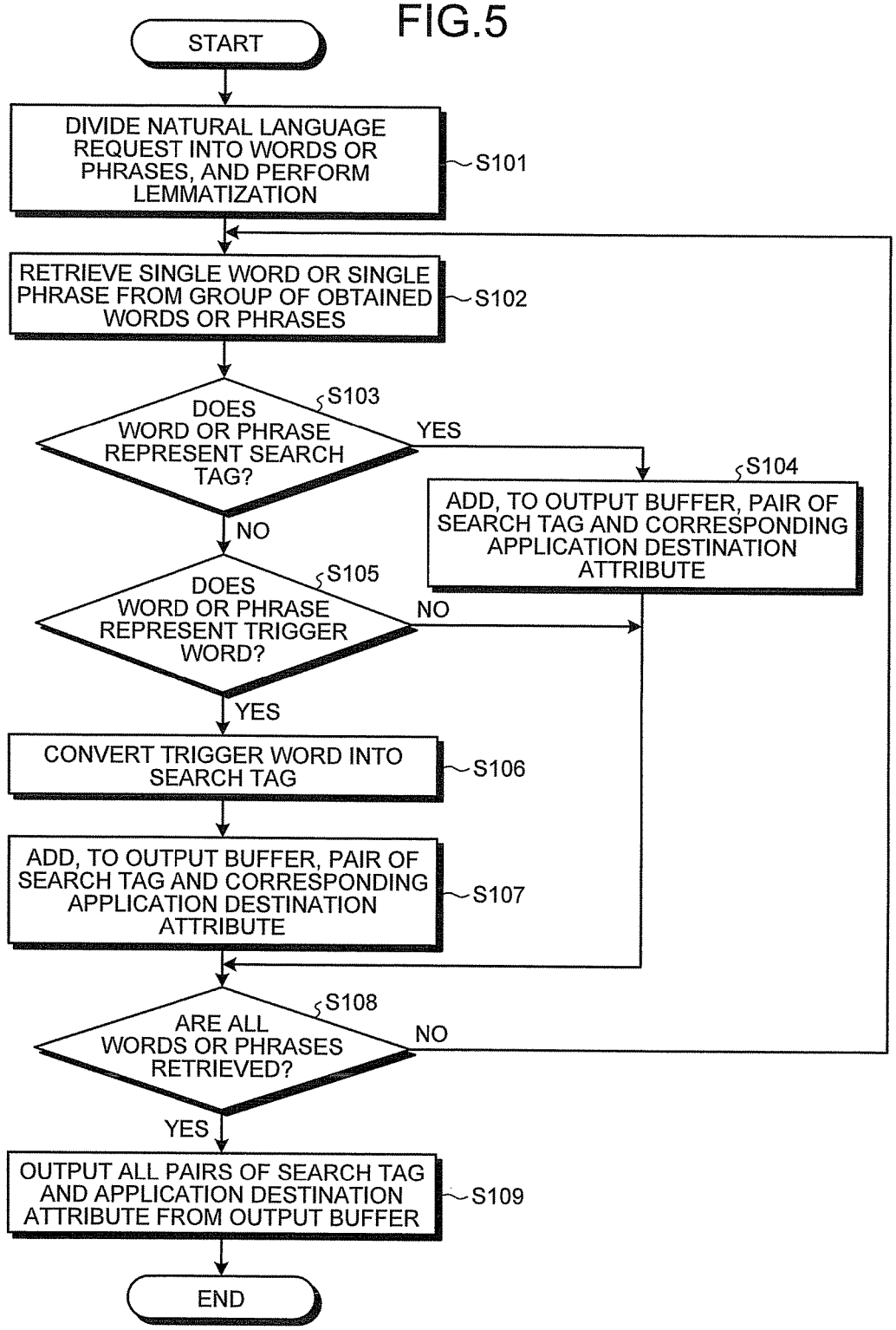

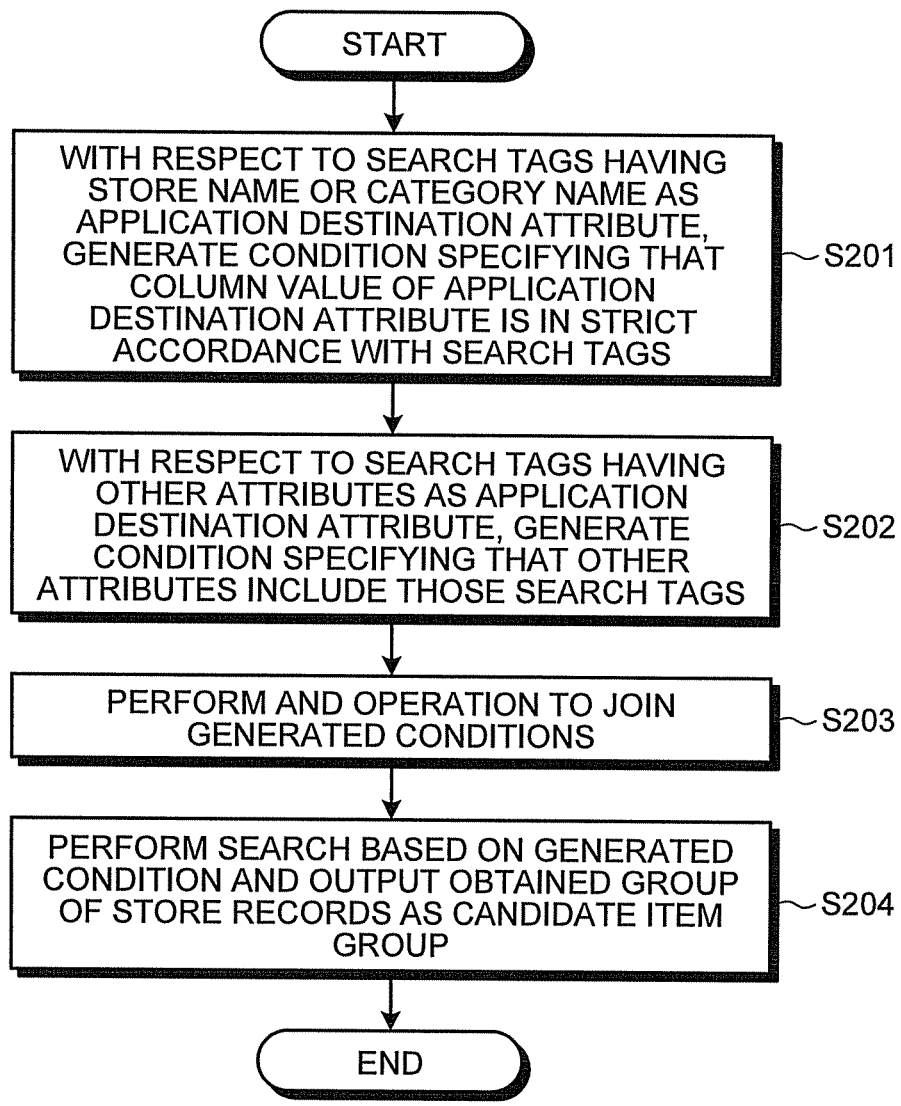

FIG.7

| | |
|---|---|
| TAGS RELATED TO SCENES | : RECREATION, DATING, BUDDHIST MEMORIAL SERVICE, WEDDING CEREMONY, ··· |
| TAGS RELATED TO ACCOMPANYING PERSONS | : ALONE, FAMILY, LOVER, ··· |
| TAGS RELATED TO OBJECTIVES | : CHITCHAT, BREATHER, KILL-TIME, ··· |
| TAGS RELATED TO SITUATIONS | : WAITING TIME, STOP OVER, ··· |
| TAGS RELATED TO TIMESLOTS | : MORNING, AFTERNOON, EVENING, NIGHTTIME, ··· |

| CONTEXT TAG | TRIGGER WORD |
|---|---|
| BANQUET | YEAR-END PARTY, CONVIVIAL PARTY, LECTURE, DRINKING PARTY, FAREWELL PARTY, ··· |
| BREATHER | BREAK, REST, LEISURELY, LAID-BACK, STRESS RELEASE, RELAXED, ··· |
| KILL-TIME | PASS TIME, WANDERING, ··· |
| ⋮ | ⋮ |

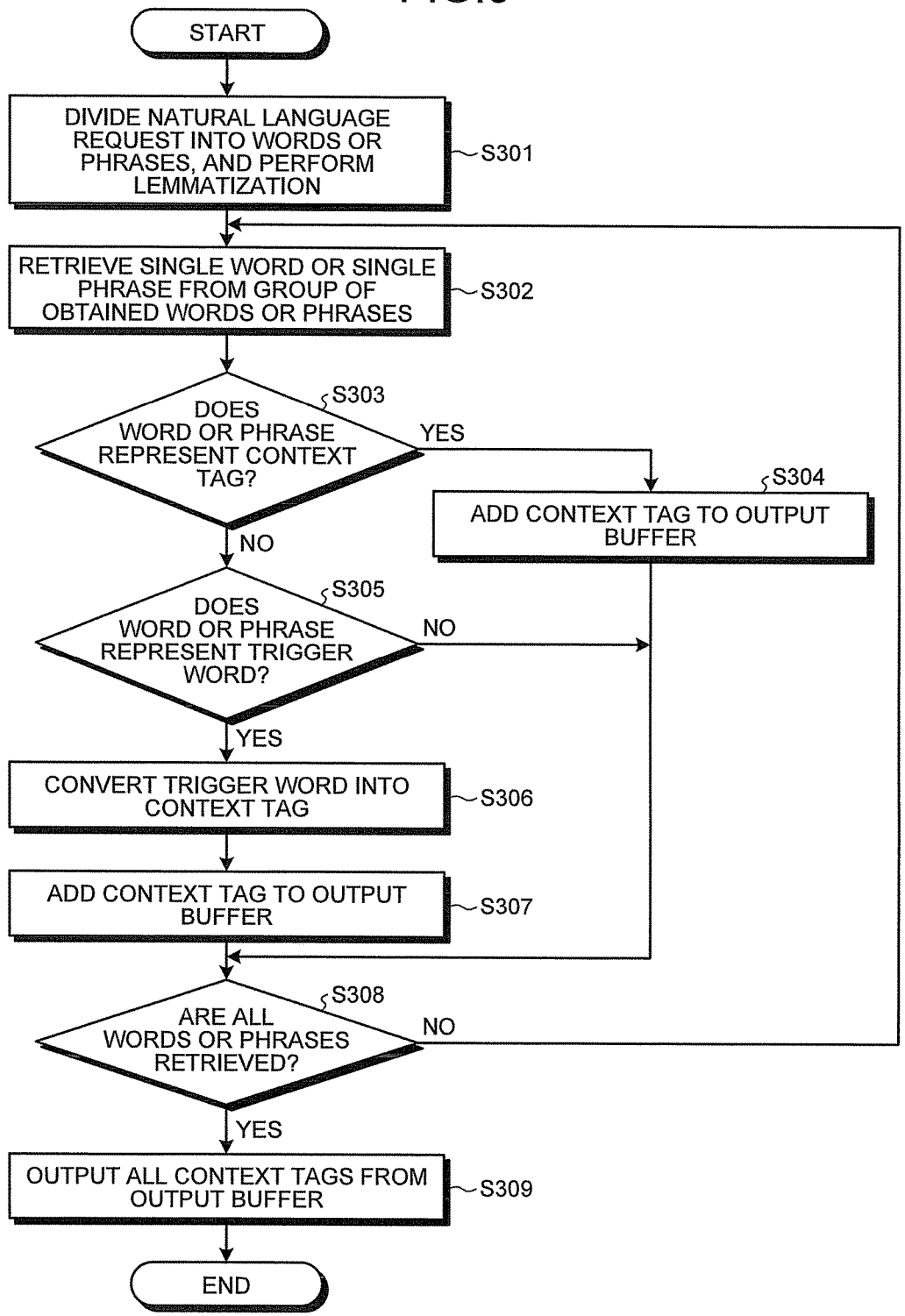

ITEM RECOMMENDATION DEVICE, ITEM RECOMMENDATION METHOD, AND COMPUTER PROGRAM PRODUCT

CROSS-REFERENCE TO RELATED APPLICATIONS

This application is based upon and claims the benefit of priority from Japanese Patent Application No. 2014-223222, filed on Oct. 31, 2014; and Japanese Patent Application No. 2015-050664, filed on Mar. 13, 2015, the entire contents of all of which are incorporated herein by reference.

FIELD

Embodiments described herein relate generally to an item recommendation device, an item recommendation method, and a computer program product.

BACKGROUND

The technology for recommending items that are expected to be of interest to a user is widely implemented in various fields such as electronic commerce (EC), advertising on the Internet, and behavioral assistance services. Regarding item recommendation, the most popular method includes generating a matrix representing the correlation between the user and the items (or representing the level of interest shown by the user in the items), and performing statistical analysis based on the matrix. However, in this method, consideration is not given to the fact that the interest or needs of the user with respect to the items changes depending on the context. In that regard, in recent years, a method with regard to a restaurant recommendation task has been proposed in which context information such as the time slot, the occasion (holiday, birthday, anniversary, etc.), the location, and the accompanying person is additionally taken into account.

In the conventional method of recommending items with the use of context information, the usable context information is limited to the information that is easily observable from outside. However, in addition to the context information that is easily observable from outside, inner information, such as the objective or the mood, of the user that can be known only by asking him or her about the intentions is also believed to be useful during item recommendation. For that reason, there has been a demand for building a mechanism that enables estimation of inner information and recommendation of items with more accuracy.

BRIEF DESCRIPTION OF THE DRAWINGS

FIG. 2 is a diagram illustrating an exemplary data structure of a store database (DB);
FIG. 3 is a diagram illustrating examples of search tags;
FIG. 4 is a diagram illustrating an exemplary data structure of a search tag dictionary;
FIG. 5 is a flowchart for explaining an exemplary sequence of operations for generating a search tag group from a natural language request;
FIG. 6 is a flowchart for explaining an exemplary sequence of operations for generating a candidate item group from a search tag group;
FIG. 7 is a diagram illustrating examples of context tags;
FIG. 8 is a diagram illustrating an exemplary data structure of a context tag dictionary;
FIG. 9 is a flowchart for explaining an exemplary sequence of operations for generating a context tag group from a natural language request.

DETAILED DESCRIPTION

Figure 1:
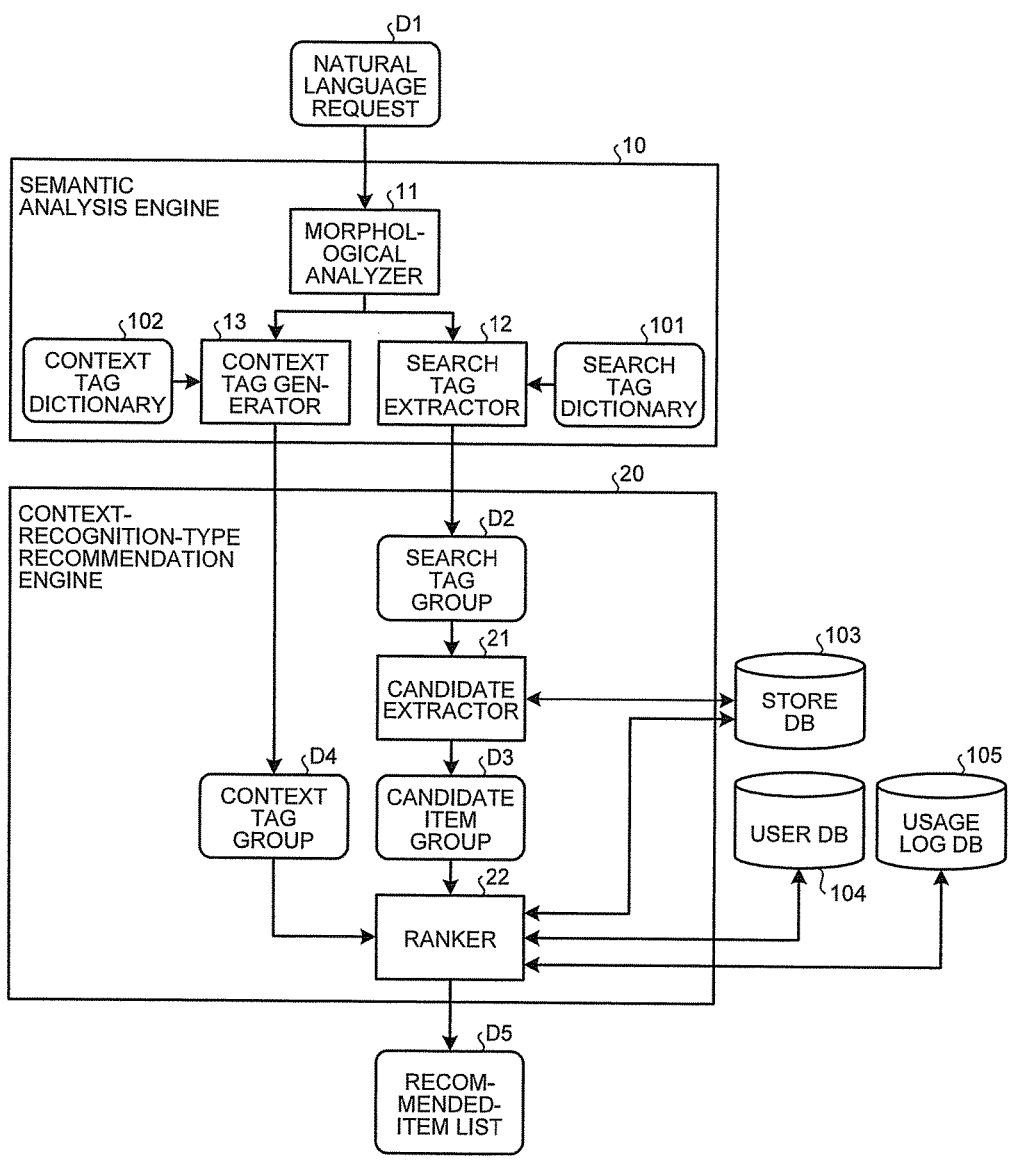
FIG. 1 is a block diagram illustrating a configuration example of an item recommendation device according to a first embodiment.

An item recommendation device includes a context information generator and a ranker. The context information generator generates and outputs context information including user intention by performing semantic analysis on a natural language request which is input. The ranker ranks candidates of items to be presented to a user based on the context information, user information representing an attribute of the user, and history information representing item usage history of the user.

The item recommendation device according to the embodiment includes a semantic analysis engine and a context-recognition-type recommendation engine. The semantic analysis engine estimates inner information of a user, such as the mood, the demand, and the objective based on a natural language request input by the user. The context-recognition-type recommendation engine performs analysis using externally-observed information (such as the date and the location) as well as the inner information as context information. A natural language request is a request issued in a natural language for recommending items. In recent years, with the development in the voice recognition technology and the popularity of handheld terminals, interactive processing with systems and services is being increasingly introduced. That is becoming the basis on which users are readily accepting the input of requests using a natural language.

In the embodiments described below, a store recommendation task, in which stores are recommended as items, is explained as the application example of the invention. An item recommendation device according to the embodiments receives input of a natural language request and outputs a recommended-item list representing a list of stores that have been ranked. Moreover, the item recommendation device maintains a usage log database (DB) as backup data in which the usage log of stores used by a group of users is maintained. Meanwhile, the recommendation operation explained in the embodiments is versatile in nature. That is, the recommendation operation is not limited to the store recommendation task as the application example, and can be implemented in various tasks.

A specific application example is explained below. In the item recommendation device according to the embodiments, for example, in response to the input of a natural language request in which "wish to give a farewell party to a same-age colleague on the next weekend" is the objective, the following operations are performed.

From the keyword "farewell party", the recommended candidates are narrowed down to stores belonging to the store categories of Japanese-style bar, bar, restaurant, cafe, and florist shop (for the purpose of buying a gift).

From the keyword "weekend", the recommended candidates are narrowed down to stores that are open on weekends.

From the keyword "farewell party", collation is performed with a tag dictionary prepared in advance, and a tag "banquet" is generated.

From the keyword "same-age colleague", collation is performed with a tag dictionary prepared in advance, and a tag "colleague" is generated.

From among the recommended candidates narrowed down according to the keywords "farewell party" and "weekend", while placing emphasis on the stores having an easy co-occurrence with the tags "banquet" and "colleague" (i.e., the stores having a track record of often being used for banquets involving colleagues), a recommended-item list is output in which the recommended candidate stores are ranked based on the usage log.

Consequently, under the condition that the stores unlikely to meet the user intentions are eliminated due to the narrowing operation, and that the stores high likely to meet the user intentions are given priority; the recommendation result suitable to the user preference is output.

First Embodiment

FIG. 1 is a block diagram illustrating a configuration example of an item recommendation device according to a first embodiment. As illustrated in FIG. 1, the item recommendation device according to the first embodiment includes a semantic analysis engine 10 and a context-recognition-type recommendation engine 20.

The semantic analysis engine 10 receives a natural language request D1 in which a user demand is specified, and outputs a search tag group D2 and a context tag group D4. Each search tag included in the search tag group D2 represents an inquiry information piece that explains the required nature of the store. Each context tag included in the context tag group D4 represents an inquiry information piece that explains the situation on the user side. With the aim of generating such tags, the semantic analysis engine 10 includes a morphological analyzer 11, a search tag extractor 12 (a search information generator), and a context tag generator 13 (a context information generator).

The context-recognition-type recommendation engine 20 receives input of the search tag group D2 and the context tag group D4 that are generated by the semantic analysis engine 10, and outputs a recommended-item list D5 as the recommendation result. The search tag group D2 serves as a constraint condition for stores and is collated with a store DB 103, thereby resulting in the generation of a narrowed-down candidate item group D3. The context tag group D4 is used in combination with user information stored in a user DB 104 and a usage log stored in a usage log DB 105, and is used in ranking the candidate items included in the candidate item group D3. The list of ranked candidate items represents the recommended-item list D5. With the aim of performing such operations, the context-recognition-type recommendation engine 20 includes a candidate extractor 21 (a candidate extractor) and a ranker 22 (a ranker).

In the following explanation, the details of the operations performed in the item recommendation device according to the first embodiment are divided into three types, namely, a "store narrowing-down operation", a "context tag group generating operation", and a "recommending operation". These operations are performed across modules.

Store Narrowing-down Operation

The store narrowing-down operation includes narrowing down the stores (candidate items), which represent the recommended candidates, based on the natural language request D1 in which the user demand is expressed. If a store name is specified in the natural language request D1, then the recommended candidates are narrowed down according to the specified store name. Alternatively, if a store category is specified in the natural language request D1, then the recommended candidates are narrowed down according to the specified store category. Still alternatively, if an expression such as "inexpensive" or "all-you-can-eat type" is specified indicating an attribute of the stores, then the recommended candidates are narrowed down according to the specified attribute.

The store DB 103 is a database for storing therein store information of all stores managed in the item recommendation device according to the first embodiment, and the store information stored in the store DB 103 is subjected to the store narrowing-down operation. In FIG. 2 is illustrated an exemplary data structure of the store DB 103. For example, the store information stored in the store DB 103 is in a tabular form as illustrated in FIG. 2; and each record has the following columns: store ID, store name, category name, and other attributes.

The store ID column has unique serial numbers assigned thereto. The store name column stores therein the store names of all stores managed in the item recommendation device according to the first embodiment. The category name column stores therein a category from among predetermined categories. The other attributes column has a multi-label format in which zero or more labels are listed from among predetermined other attributes indicating the features of the stores. It is desirable that the labels of other attributes include labels from various perspectives such as the service contents, the product features, and the ambience.

Given below is the explanation of an operation for generating the search tag group D2 from the natural language request D1. In FIG. 3 are illustrated examples of search tags that are managed in the item recommendation device according to the first embodiment. As illustrated in FIG. 3, the search tags include tags related to store names, tags related to category names, and tags related to other attributes.

Given below is the explanation of a search tag dictionary 101 used during the operation for generating the search tag group D2. In the natural language request D1 that is input, the search tag dictionary 101 is used as the source of knowledge for assimilating different wording or assimilating different modes of expression that are based on different perspectives. With that, even if there is no direct reference in the expression of the user demand, the intentions can be understood and used in narrowing down the target stores.

In FIG. 4 is illustrated a data structure of the search tag dictionary 101. For example, the search tag dictionary 101 is in a tabular form as illustrated in FIG. 4; and each record has the following columns: search tag, application destination attribute, and trigger word.

The search tag column is unique in nature for each record, and stores therein the search tags managed in the item recommendation device according to the first embodiment. However, not all search tags need to be always stored. The application destination attribute column stores therein the category name on which the search tag imposes a limitation. For example, in the case of a record in which the search tag indicates a category name such as "Japanese-style bar", the application destination attribute column of that record has a value called "category name" stored therein. The trigger word column has a multi-label format in which words or phrases acting as the trigger for search tag generation (hereinafter, called "trigger words") are listed. During the operation for generating the search tag group D2, with respect to the natural language request D1 in which trigger words such as "alcoholic beverage", "drinking party", and "dining" are specified; using the search tag dictionary 101 illustrated in FIG. 4 results in the generation of a search tag "Japanese-style bar", and the stores are narrowed down using the search tag as a constraint condition for the category name.

FIG. 5 is a flowchart for explaining an exemplary sequence of operations for generating the search tag group D2 from the natural language request D1. The item recommendation device according to the first embodiment performs operations from Steps S101 to S109 explained below, and generates the search tag group D2 from the natural language request D1.

Step S101: the morphological analyzer 11 divides the natural language request D1 into words or phrases and performs lemmatization.

Step S102: the search tag extractor 12 retrieves a single word or a single phrase from the group of words or phrases obtained at Step S101.

Step S103: the search tag extractor 12 determines whether or not the word or the phrase retrieved at Step S102 is a search tag. If the retrieved word or the retrieved phrase is a search tag (Yes at Step S103), then the system control proceeds to Step S104. However, if the retrieved word or the retrieved phrase is not a search tag (No at Step S103), then the system control proceeds to Step S105.

Step S104: the search tag extractor 12 adds, to an output buffer, a pair of a search tag, which matches with the word or the phrase retrieved at Step S102, and an application destination attribute corresponding to that search tag. Then, the system control proceeds to Step S108.

Step S105: the search tag extractor 12 determines whether or not the word or the phrase retrieved at Step S102 is a trigger word. If the retrieved word or the retrieved phrase is a trigger word (Yes at Step S105), then the system control proceeds to Step S106. However, if the retrieved word or the retrieved phrase is not a trigger word (No at Step S105), then the system control proceeds to Step S108.

Step S106: the search tag extractor 12 converts the trigger word, which matches with the word or the phrase retrieved at Step S102, into a search tag corresponding to that trigger word.

Step S107: the search tag extractor 12 adds, to the output buffer, a pair of the search tag, which is obtained by conversion of the trigger word at Step S106, and an application destination attribute corresponding to that search tag.

Step S108: the search tag extractor 12 determines whether or not all words or phrases included in the group of words or phrases obtained at Step S101 have been retrieved. If all words or phrases have been retrieved (Yes at Step S108), then the system control proceeds to Step S109. However, if all words or phrases have not been retrieved (No at Step S108), then the system control returns to Step S102.

Step S109: the search tag extractor 12 outputs all pairs of a search tag and an application destination attribute that are added to the output buffer. That marks the end of the operations. The set of pairs of a search tag and an application destination attribute as output at Step S109 represent the search tag group D2.

Given below is the explanation of an operation for generating the candidate item group D3 from the search tag group D2. FIG. 6 is a flowchart for explaining an exemplary sequence of operations for generating the candidate item group D3 from the search tag group D2. The item recommendation device according to the first embodiment performs operations from Steps S201 to S204 explained below, and generates the candidate item group D3 from the search tag group D2.

Step S201: from among the search tags included in the search tag group D3, with respect to the search tags having the store name or the category name as the application destination attribute, the candidate extractor 21 generates a condition specifying that the column value of the application destination attribute is in strict accordance with the search tags.

Step S202: from among the search tags included in the search tag group D2, with respect to the search tags having other attributes as the application destination attribute, the candidate extractor 21 generates a condition specifying that the other attributes include those search tags.

Step S203: the candidate extractor 21 performs an AND operation to join the conditions generated at Steps S201 and S202.

Step S204: the candidate extractor 21 searches the store DB 103 based on the condition generated at Step S203, and outputs the obtained group of store records as the candidate item group D3. That marks the end of the operations.

Context Tag Group Generating Operation

The context tag group generating operation includes generating the context tag group D4, which represents context information including inner information of the user, based on the natural language request D1 in which the user demand is expressed.

In FIG. 7 are illustrated examples of context tags managed in the item recommendation device according to the first embodiment. As explained earlier, a context tag represents an inquiry information piece that explains the situation on the user side. As illustrated in FIG. 7, the context tags according to the first embodiment include tags related to scenes, tags related to accompanying persons, tags related to objectives, tags related to situations, and tags related to timeslots.

Given below is the explanation about a context tag dictionary 102 used during the operation for generating the context tag group D4. In the natural language request D1 that is input, the context tag dictionary 102 is used as the source of knowledge for assimilating different wording or assimilating different modes of expression that are based on different perspectives. With that, even if there is no direct reference in the expression of the user demand, the intentions can be understood and one or more corresponding tags can be output from among predetermined context tags.

In FIG. 8 is illustrated a data structure of the context tag dictionary 102. For example, the context tag dictionary 102 is in a tabular form as illustrated in FIG. 8; and each record has the following columns: context tag and trigger word.

The context tag column is unique in nature for each record, and stores therein the context tags managed in the item recommendation device according to the first embodiment. However, not all context tags need to be always stored. The trigger word column has a multi-label format in which trigger words acting as the trigger for context tag generation are listed. During the operation for generating the context tag group D4, with respect to the natural language request D1 in which trigger words such as "year-end party", "convivial party", "lecture", "drinking party", and "farewell party" are specified; using the context tag dictionary 102 illustrated in FIG. 8 results in the generation of a context tag "banquet".

FIG. 9 is a flowchart for explaining an exemplary sequence of operations for generating the context tag group D4 from the natural language request D1. The item recommendation device according to the first embodiment performs operations from Steps S301 to S309 explained below, and generates the context tag group D4 from the natural language request D1.

Step S301: the morphological analyzer 11 divides the natural language request D1 into words or phrases and performs lemmatization.

Step S302: the context tag extractor 13 retrieves a single word or a single phrase from the group of words or phrases obtained at Step S301.

Step S303: the context tag extractor 13 determines whether or not the word or the phrase retrieved at Step S302 is a context tag. If the retrieved word or the retrieved phrase is a context tag (Yes at Step S303), then the system control proceeds to Step S304. However, if the retrieved word or the retrieved phrase is not a context tag (No at Step S303), then the system control proceeds to Step S305.

Step S304: the context tag extractor 13 adds, to an output buffer, a context tag matching with the word or the phrase retrieved at Step S302. Then, the system control proceeds to Step S308.

Step S305: the context tag extractor 13 determines whether or not the word or the phrase retrieved at Step S302 is a trigger word. If the retrieved word or the retrieved phrase is a trigger word (Yes at Step S305), then the system control proceeds to Step S306. However, if the retrieved word or the retrieved phrase is not a trigger word (No at Step S305), then the system control proceeds to Step S308.

Step S306: the context tag extractor 13 converts the trigger word, which matches with the word or the phrase retrieved at Step S302, into a context tag corresponding to that trigger word.

Step S307: the context tag extractor 13 adds, to the output buffer, the context tag obtained by conversion of the trigger word at Step S306.

Step S308: the context tag extractor 13 determines whether or not all words or phrases included in the group of words or phrases obtained at Step S301 have been retrieved. If all words or phrases have been retrieved (Yes at Step S308), then the system control proceeds to Step S309. However, if all words or phrases have not been retrieved (No at Step S308), then the system control returns to Step S302.

Step S309: the context tag extractor 13 outputs all context tags that are added to the output buffer. That marks the end of the operations. The set of context tags output at Step S309 represents the context tag group D4.

Recommending Operation

In the item recommendation device according to the first embodiment, based on the context tag group D4, based on the user information stored in the user DB 104, and based on the usage log stored in the usage log DB 105; the ranker 22 of the context-recognition-type recommendation engine 20 ranks the candidate items included in the candidate item group D3 and outputs the ranking result as the recommended-item list D5. Herein, the ranker 22 ranks the candidate items by performing a machine-learning-based learning operation and an estimating operation. In the learning operation and the estimating operation, it is possible to implement, for example, the probabilistic latent relational model explained in Contextual recommendations based on text mining, Li, Yize, et al. Processing of the 23rd International Conference on Computation Linguistics: Posters. Association for Computational Linguistics, 2010. However, any other method capable of dealing with context information can alternatively be implemented.

Prior to explaining the algorithm, the explanation is given about the user DB 104 and the usage log DB 105 that are used in the ranker 22 of the context-recognition-type recommendation engine 20.

Figure 10:
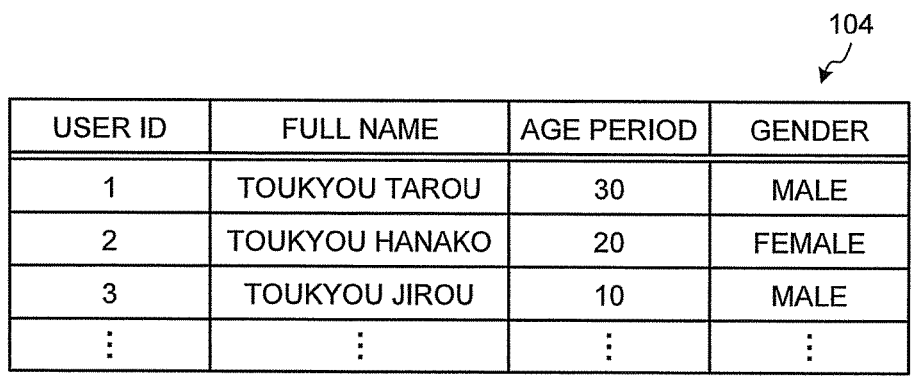
FIG. 10 is a diagram illustrating an exemplary data structure of a user DB.

The user DB 104 is a database for storing therein user information that represents user attributes of all registered users managed in the item recommendation device according to the first embodiment. In FIG. 10 is illustrated an exemplary data structure of the user DB 104. For example, the user information stored in the user DB 104 is in a tabular form as illustrated in FIG. 10; and each record has the following columns: user ID, full name, age period, and gender. Besides, other arbitrary columns, such as profession and favorite music category, that are helpful in giving recommendation can also be added.

The user ID column has unique serial numbers assigned thereto. The full name column stores therein the full name of the registered users. The age column stores therein the age (teens, 20's, 30's, etc.) of the registered users. The gender column stores therein the gender of the registered users.

Figure 11:
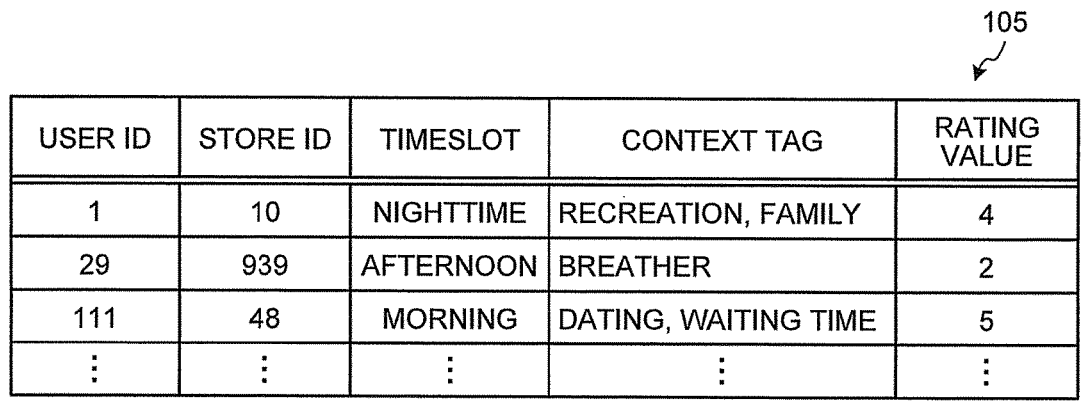
FIG. 11 is a diagram illustrating an exemplary data structure of a usage log DB.

The usage log DB 105 is a database for storing therein a usage log (history information) that represents the store usage history regarding each registered user. In FIG. 11 is illustrated an exemplary data structure of the usage log DB 105. The usage log stored in the usage log DB 105 is in a tabular form as illustrated in FIG. 11; and each record has the following columns: user ID, store ID, timeslot, context tag, and rating value.

Each record corresponds to a single store visit by a user. The user ID column, the store ID column, and the timeslot column are used to respectively store the user ID of the user who visited the store, the store ID of the visited store, and the timeslot of the store visit. In the context tag column, a value gets stored only when, before visiting a store, the natural language request D1 is issued as an item recommendation request with respect to the item recommendation device according to the first embodiment. Thus, in the context tag column, the context tag used during the related operation is stored. The rating value column stores therein a rating value representing an evaluation value that the user is asked to input with respect to the store after the visit. Herein, the rating value takes an integer value in the range of "0" to "5", with "5" being the best evaluation value. When it is difficult to ask the user to input the rating value, a fixed value such as "5" can be input as a substitute value, for example. That is equivalent to the case in which the stores visited by the user are given the rating value of "5" and the stores not visited by the user are given the rating value of "0".

Prior to explaining the algorithm, the explanation is given about the probabilistic model used in the ranker 22 of the context-recognition-type recommendation engine 20. This probabilistic model is based on the probabilistic latent relational model explained in Contextual recommendations based on text mining, Li, Yize, et al., Processing of the 23rd International Conference on Computation Linguistics: Posters. Association for Computational Linguistics, 2010, and in which the context suitability and the user preference are reflected in a balanced manner.

Equations (1) and (2) given below represent modelization of the probabilistic model of rating values when the target user, the target context, and the target store are known.

$$y_{i,j,c} \sim N(u_{i,j,c}, 1/\lambda^{(y)}) \quad (1)$$

$$u_{i,j,c} = u_j^T A v_j + (w_u f_i)^T (w_v f_j) \quad (2)$$

i: a user ID
j: a store ID
c: a context tag group
$y_{i,j,c}$: a rating value for the store j when the user i and the context tag group c are known
$u_{i,j,c}$: the average of the rating value for the store j when the user i and the context tag group c are known
$\hat{y}_{i,j,c}$: a model estimation value of the rating value for the store j when the user i and the context tag group c are known
$\lambda^{(y)}$: the accuracy of $y_{i,j,c}$ (reciprocal of dispersion)
$u_i$: a feature vector representing a potential feature of the user i
$v_j$: a feature vector representing a potential feature of the store j
A: a correlation matrix of ui and vj
$f_i$: a (visible) feature vector extracted in relation to the user i and the context tag specified in natural language request
$f_j$: a (visible) feature vector extracted in relation to the store j
$w_u^T w_v$: a correlation matrix of fi and fj written in a factorization formula In Equation (2), the first member on the right side represents modelization of long-term preference of the user with respect to stores, and the second member on the right side represents modelization of suitability (short-term preference) of the user with respect to the current context. Since the sum of both members is an objective function, a recommendation model is learnt that reflects both members in a balanced manner. Of the variables in Equations (1) and (2); $y_{i,j,c}$, $f_i$, and $f_j$ represent the variables given from a dataset, and the values of the remaining variables or the probabilistic distribution is decided by learning.

The potential feature vector $u_i$ of the user indicates the preference of the user, such as being fond of restaurants having spicy food or being fond of upscale accessory stores, that is decided from the result of dataset-based learning. The potential feature vector $v_j$ of the stores is also identical. Moreover, $f_i$ and $f_j$ represent feature vectors having element values given in a definite manner based on the predetermined feature vector design and the observed facts. In contrast, $u_i$ and $u_j$ represent feature vectors to which only the number of dimensions is given in advance.

Equation (2) is obtained by performing marginalization with the distribution of potential vectors of the users and the stores.

Given below is the explanation of a learning algorithm for learning various parameters. Herein, it is assumed that the method explained in Contextual recommendations based on text mining, Li, Yize, et al., Processing of the 23rd International Conference on Computation Linguistics: Posters. Association for Computational Linguistics, 2010 is implemented in the algorithm.

The mathematical objective in a learning operation is to obtain the probabilistic distribution of the feature vector $u_i$, the probabilistic distribution of the feature vector $v_j$, the matrix A, and a matrix W, which are calculated using Equations (1) and (2) given above, in such a way that the joint probability of the group of all case examples (each record is treated as a case example) in the usage log DB 105 is maximized.

Firstly, as preparation, the following variables in Equations (1) and (2) are assigned with values on a record-by-record basis.

$\lambda^{(y)}$: a suitable value is assigned (super parameter)
$y_{i,j,c}$: a rating value when the user i, the store j, and the context tag group c are known
$f_i$: a (visible) feature vector extracted in relation to the user i and the context tag in a natural language request
$f_j$: a (visible) feature vector extracted in relation to the store j To the rating value $y_{i,j,c}$, the value in the rating value column of the usage log DB 105 is given without modification. To the feature vector $f_i$, vector element values are given according to a predesigned configuration of feature vectors. As the components for generating vectors, it is assumed that various attributes of the user that are stored in the user DB 104 are used and the timeslot and the context tag of the record that are stored in the usage log DB 105 are used, and binary is taken about whether or not the element values of each feature vector fit the criteria. The same is the case regarding the feature vector $f_j$, and various attributes of the store that are stored in the store DB 103 are stored as the components. When the probability of the rating value $y_{i,j,c}$ of each record as formulated in the abovementioned manner is added for all records, the joint probability of all case examples is obtained. In this way, issue formulation reflecting the data set reaches completion.

Given below is a brief explanation of the sequence of solving the probabilistic distribution of the feature vector $u_i$, the probabilistic distribution of the feature vector $v_j$, the matrix A, and the matrix W. Firstly, since it is difficult to obtain the solution in the current condition, it is assumed that the probabilistic distribution of the feature vector $u_i$ and the probabilistic distribution of the feature vector $v_j$ follow the Gaussian distribution having the average of "0" and the accuracy of $\lambda^{(u)}$ and $\lambda^{(v)}$. With that, the variables to be solved change to $\lambda^{(u)}$, $\lambda^{(v)}$, the matrix A, and the matrix W.

Regarding $\lambda^{(u)}$ and $\lambda^{(v)}$ and regarding the matrix A and the matrix W, the EM algorithm is implemented in which keeping one type of members fixed and optimizing the other type of members is performed in an alternate manner. More particularly, in E-Step, the matrix A and the matrix W are fixed to the present value, and $\lambda^{(u)}$ and $\lambda^{(v)}$ are optimized using variational Bayes. Then, in M-Step, $\lambda^{(u)}$ and $\lambda^{(v)}$ are fixed to the present value, and the matrix A and the matrix W are optimized using the method of steepest descent. The E-Step and the M-Step are repeated until convergence is achieved. This represents the learning algorithm.

Given below is the explanation about the algorithm for estimating various parameters. In the estimation operation, Equation (3) given below is used. Firstly, the explanation is given about the basic principle.

$$\hat{y}_{i,j,c} = \int_{u_i, v_j} P(u_i) P(v_j)(u_i^T A v_j + (w_u f_i)^T w_v f_j) du_i dv_j \quad (3)$$

Firstly, as preparation, to $\lambda^{(u)}$, $\lambda^{(v)}$, the matrix A, and the matrix W that are already obtained in the learning operation are put in Equation (3). Then, the feature vector $f_i$ is generated based on various parameters of the current user that are stored in the user DB 104 and based on the context tag group D4 of the record stored in the usage log DB 105. Subsequently, the feature vector $f_i$ is also put in Equation (3). At this stage, only the feature vector $f_j$ remains to be set. Lastly, for each store maintained in the store DB 103, the feature vector $f_j$ generated from the attributes of the store is sequentially put in Equation (3), and a rating estimation value is obtained using the numerical formula that has been completed. Then, the group of stores is sorted in descending order of rating and is then output. This group of stores represents the recommended-item list D5.

Figure 12:
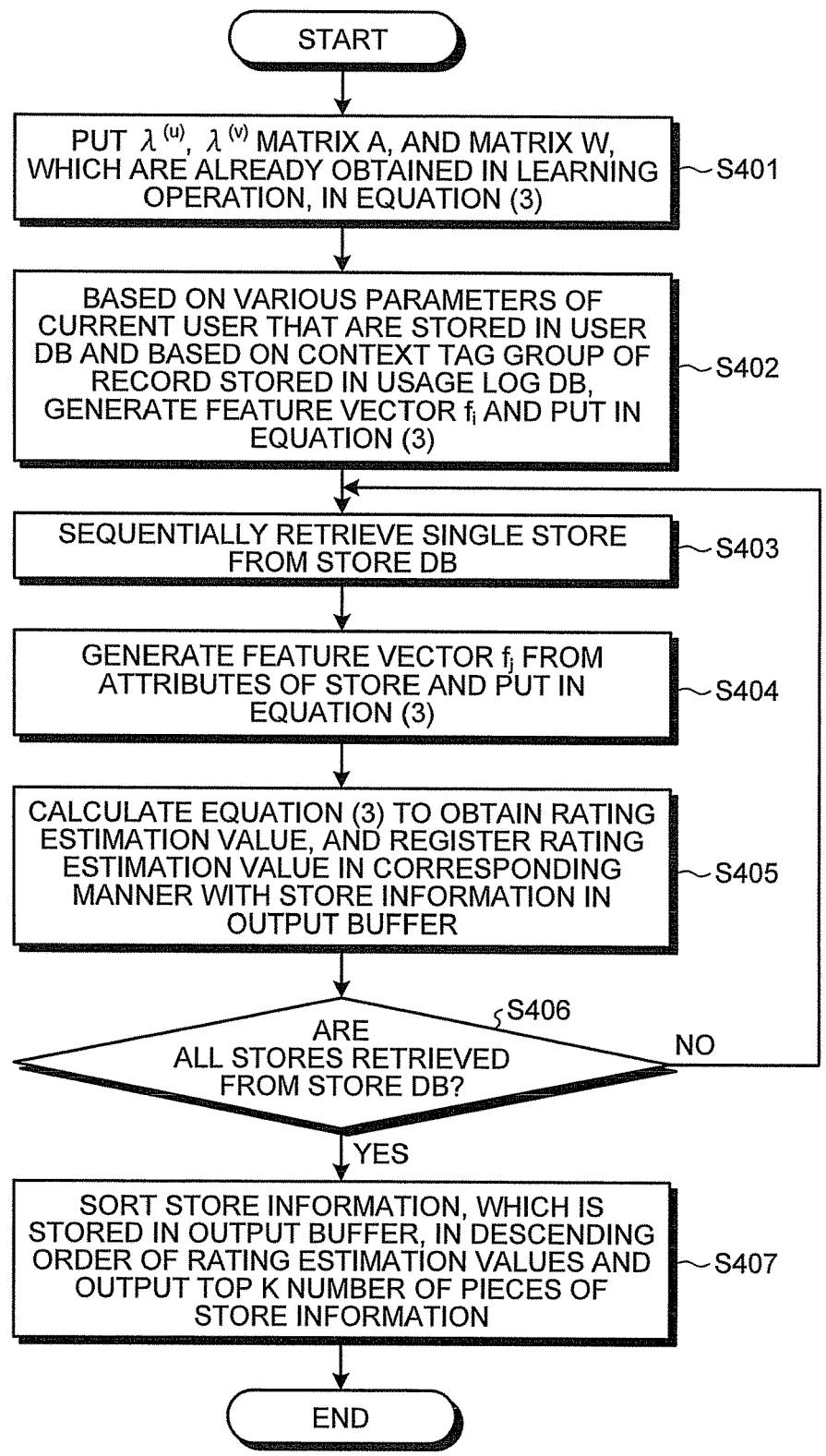
FIG. 12 is a flowchart for explaining a sequence of operations performed during an estimation operation.

FIG. 12 is a flowchart for explaining a sequence of operations performed during the estimation operation. The ranker 22 of the context-recognition-type recommendation engine 20 performs operations from Steps S401 to S407, and generates and outputs the recommended-item list D5.

Step S401: the ranker 22 puts $\lambda^{(u)}$, $\lambda^{(v)}$, the matrix A, and the matrix W, which are already obtained in the learning operation, in Equation (3).

Step S402: the ranker 22 generates the feature vector $f_i$ based on various parameters of the current user that are stored in the user DB 104 and based on the context tag group D4 of the record stored in the usage log DB 105, and puts the feature vector $f_i$ in Equation (3).

Step S403: the ranker 22 sequentially retrieves a single store from the store DB 103.

Step S404: the ranker 22 generates the feature vector $f_j$ from the attributes of the store retrieved at Step S403, and puts the feature vector $f_j$ in Equation (3).

Step S405: the ranker 22 calculates Equation (3) to obtain a rating estimation value, and registers the rating estimation value in association with the store information in the output buffer.

Step S406: the ranker 22 determines whether or not all stores have been retrieved from the store DB 103. If all stores have been retrieved (Yes at Step S406), then the system control proceeds to Step S407. However, if all stores have not been retrieved (No at Step S406), then the system control returns to Step S403.

Step S407: the ranker 22 sorts the store information, which is stored in the output buffer, in descending order of the rating estimation values, and outputs top k number of pieces of store information as the recommended-item list D5. That marks the end of the operations. Herein, k is predetermined constant number.

In this way, the recommended-item list D5 with ranking is obtained in which the inner context information taken from the natural language request D1 and the preference determined from the usage history of the users and the stores are reflected. Meanwhile, regarding the display on a screen using the recommended-item list D5, any arbitrary method can be implemented. Hence, that explanation is not given herein.

As described above in detail with reference to specific examples, in the item recommendation device according to the first embodiment, it becomes possible to recommend items with more accuracy using not only the context information observable from outside but also the inner information estimated from the natural language request D1.

Meanwhile, in the first embodiment, the configuration is such that the candidate extractor 21 narrows down the stores representing candidate items using the search tag group D2, and then the ranker 22 performs ranking with respect to the candidate item group D3. However, that is not the only possible case. Alternatively, for example, the configuration can be such that the ranker 22 narrows down the candidate items using the search tag group D2 as well as performs ranking. Still alternatively, the configuration can be such that the ranker 22 firstly performs ranking, and then the candidate items are narrowed down based on the search tag group D2.

Second Embodiment

Given below is the explanation of an item recommendation device according to a second embodiment. In the item recommendation device according to the second embodiment, the context tag generation operation performed by the semantic analysis engine 10 of the item recommendation device according to the first embodiment is replaced with a statistics-based operation. Explained below are the differences with the first embodiment.

Figure 13:
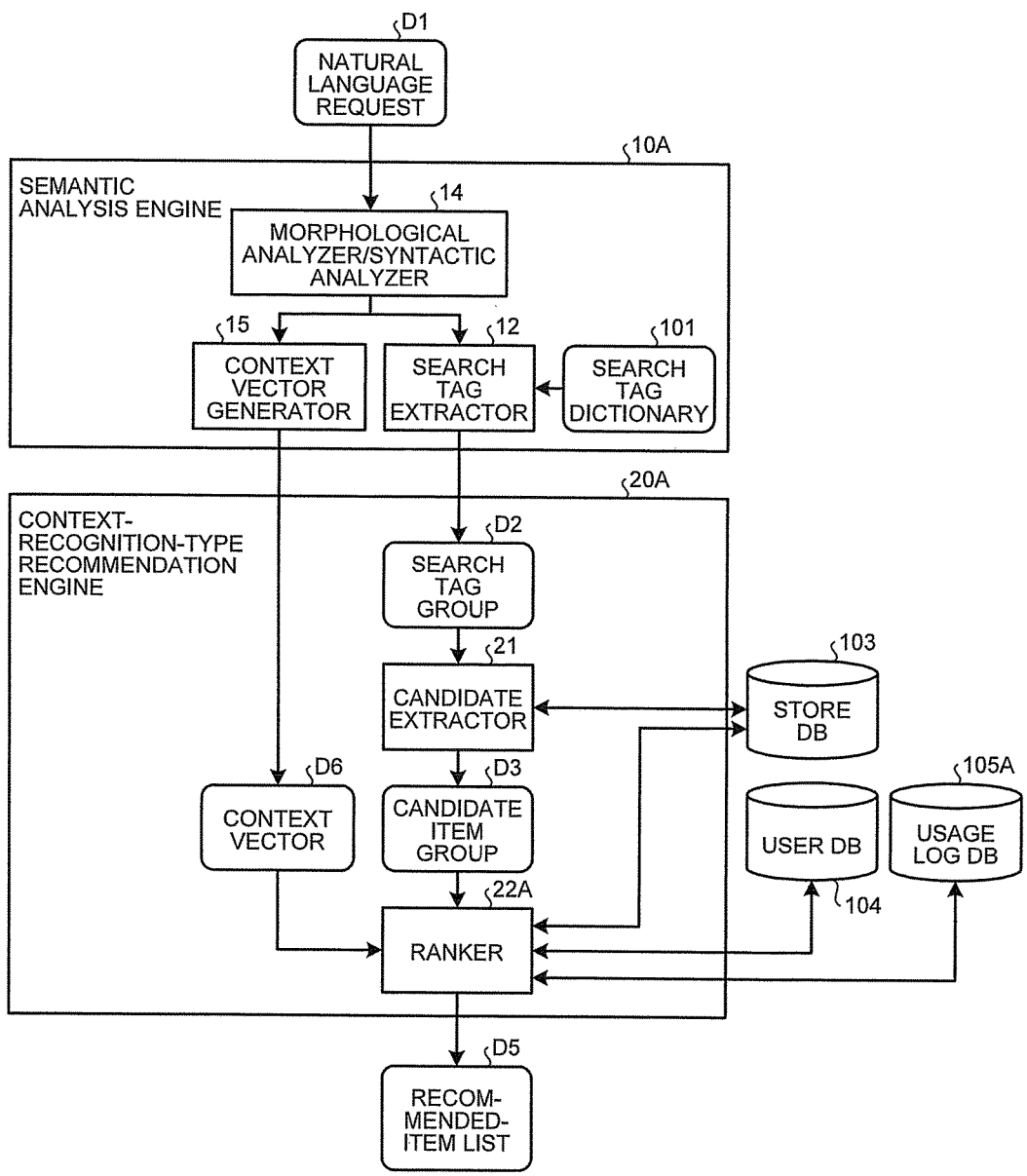
FIG. 13 is a block diagram illustrating a configuration example of an item recommendation device according to a second embodiment.

FIG. 13 is a block diagram illustrating a configuration example of the item recommendation device according to the second embodiment. As illustrated in FIG. 13, the item recommendation device according to the second embodiment includes a semantic analysis engine 10A and a context-recognition-type recommendation engine 20A. In the semantic analysis engine 10A, the morphological analyzer 11 explained in the first embodiment is replaced with a morphological analyzer/syntactic analyzer 14, and the context tag generator 13 is replaced with a context vector generator 15. In the context-recognition-type recommendation engine 20A, the ranker 22 explained in the second embodiment is replaced with a ranker 22A, which refers to a context vector D6 instead of referring to the context tag group D4 according to the first embodiment, which refers to a usage log DB 105A instead of referring to the usage log DB 105, but which performs the learning operation and the estimation operation in an identical manner to the ranker 22 according to the first embodiment.

Figure 14:
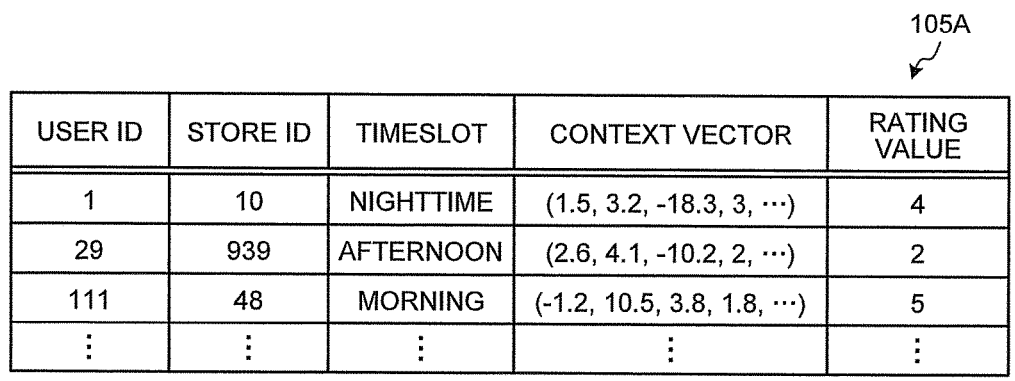
FIG. 14 is a diagram illustrating an exemplary data structure of a usage log DB.

FIG. 14 is a diagram illustrating an exemplary data structure of the usage log DB 105A used in the learning operation and the estimation operation according to the second embodiment. In the usage log DB 105A according to the second embodiment, the context tag column included in the usage log DB 105 illustrated in FIG. 11 according to the first embodiment is replaced with a context vector column in which a value is stored only when, before visiting a store, the natural language request D1 is issued as an item recommendation request with respect to the item recommendation device according to the second embodiment. Thus, in the context vector column, the context tag used during the related operation is stored.

The context tag generator 13 according to the first embodiment refers to a group of rules called the context tag dictionary 102, and performs an operation for mapping arbitrary phrases included in the natural language request D1 to context tags. In the context-recognition-type recommendation engine 20, the context tag is used as a vector representing the context. That is, the operation described above implies generating a context vector having a particular number of dimensions from an arbitrary phase.

In an identical manner, the context tag generator 13 according to the second embodiment too performs an operation for generating the context vector D6 having a particular number of dimensions from arbitrary phrases included in the natural language request D1. The only differences are as follows: semantic analysis as well as syntactic analysis is performed; a statistical method called Matrix-Vector RNNs (described later) is implemented for generating the context vector D6; and the output vector is not a binary vector but a real vector.

As the impact on the effect, the difference is that rules such as the context tag dictionary 102 need not be generated in advance (instead, only the number of dimensions of the context vector D6 is given from outside). The user needs are immeasurable, and it is essentially difficult to write the rules that universally cover the user needs. Hence, it is an advantage to not have to generate the rules. However, as far as controlling the recommendation operation related to a particular perspective is concerned, in the first embodiment, the situation can be handled just by writing the rules. However, in the second embodiment, it becomes a difficult task.

Figure 15:
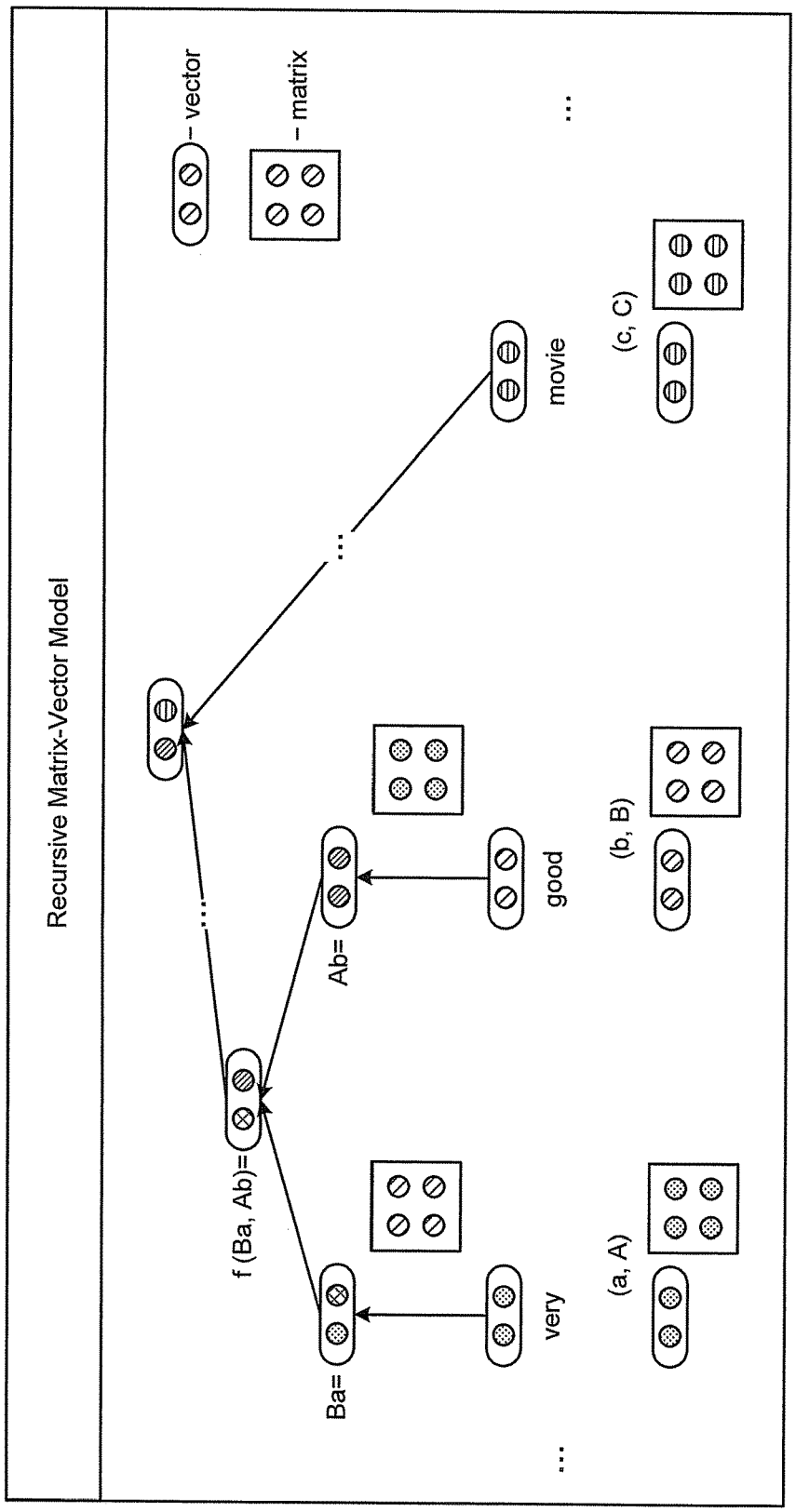
FIG. 15 is a diagram for explaining a mathematical model used in a statistical operation for generating a context vector.

Given below is the explanation of a mathematical model used in the statistical operation for generating the context vector D6. This mathematical model is based on Matrix-Vector RNNs (MV-RNN) that is proposed in Reference Literature 1 mentioned below. FIG. 15 is a diagram for explaining the mathematical model used in the statistical operation for generating the context vector D6, and represents the mathematical model illustrated in Reference Literature 1 mentioned below.

(Reference Literature 1) Semantic Compositionality through Recursive Matrix-Vector Spaces, Richard Socher, Brody Huval, Christopher D. Manning, and Andrew Y. Ng. Conference on Empirical Methods in Natural Language Processing, 2012.

Firstly, the explanation is given about the structure of the mathematical model. MV-RNN is a recursive neural network having a tree structure. In each terminal node, the words included in the text are arranged in the order of appearance. The tree structure is formed parallel with the syntactic analysis structure of the text.

Given below is the explanation of the calculating formula. In the terminal nodes, meaning vectors of the words are arranged. As the meaning vector of each word, the result obtained in advance according to a method called Word2Vec is used as proposed in Reference Literature 2 mentioned below.

(Reference Literature 2) Recurrent neural network based language model, T Mikolov, M Karafiat, L Burget, J Cernocky, S Khudanpur. INTERSPEECH 2010.

In the non-terminal nodes, the calculation given below in Equation (4) is set. Herein, $c_1$ and $c_2$ represent vectors output by child nodes; $C_x(C_1, C_2)$ represents a meaning operation matrix prepared for each word type in the child nodes; W represents a weight matrix shared among all non-terminal nodes; b represents a bias (a scalar variable) shared among all non-terminal nodes; and the output of the top node is a real vector indicating the constitutive meaning of the entire input text.

$$p = \tanh\left(w^T \begin{pmatrix} C_2 c_1 \\ C_1 c_2 \end{pmatrix} + b\right) \quad (4)$$

Figure 16:
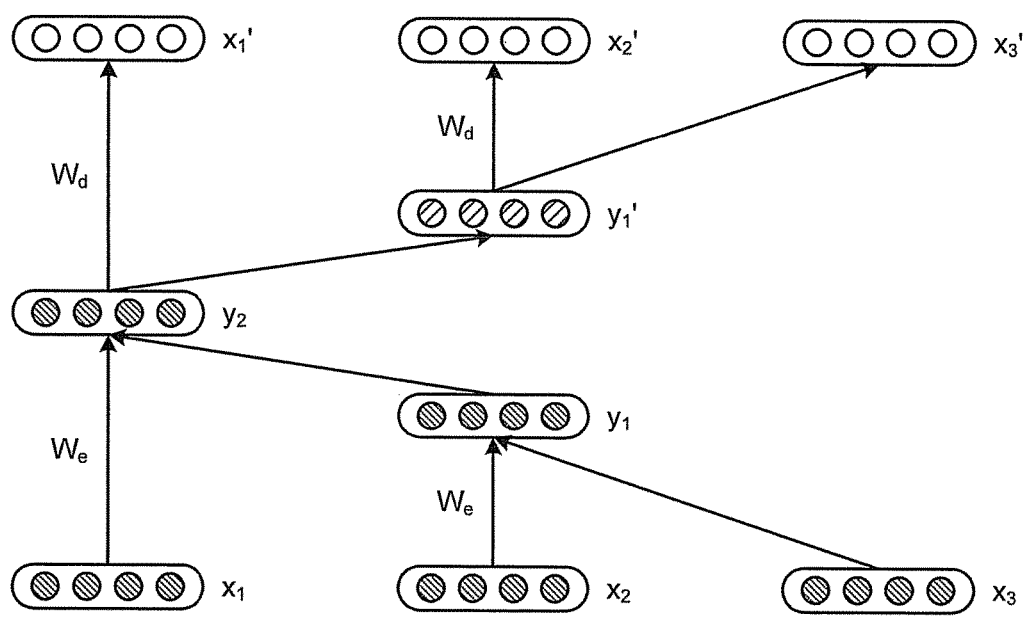
FIG. 16 is a diagram for explaining a learning method for learning various parameters in the mathematical model illustrated in FIG. 15.

Given below is the explanation of a learning method for learning various parameters of MV-RNN. This learning method is based on Unsupervised Unfolding RAE that is proposed in Reference Literature 3 mentioned below. FIG. 16 is a diagram for explaining a learning method for learning various parameters in the mathematical model illustrated in FIG. 15, and represents the mathematical model illustrated in Reference Literature 3 mentioned below.

(Reference Literature 3) Dynamic Pooling and Unfolding Recursive Autoencoders for Paraphrase Detection, Richard Socher, Eric H. Huang, Jeffrey Pennington, Andrew Y. Ng, and Christopher D. Manning. Advances in Neural Information Processing Systems 2011.

Figure 17:
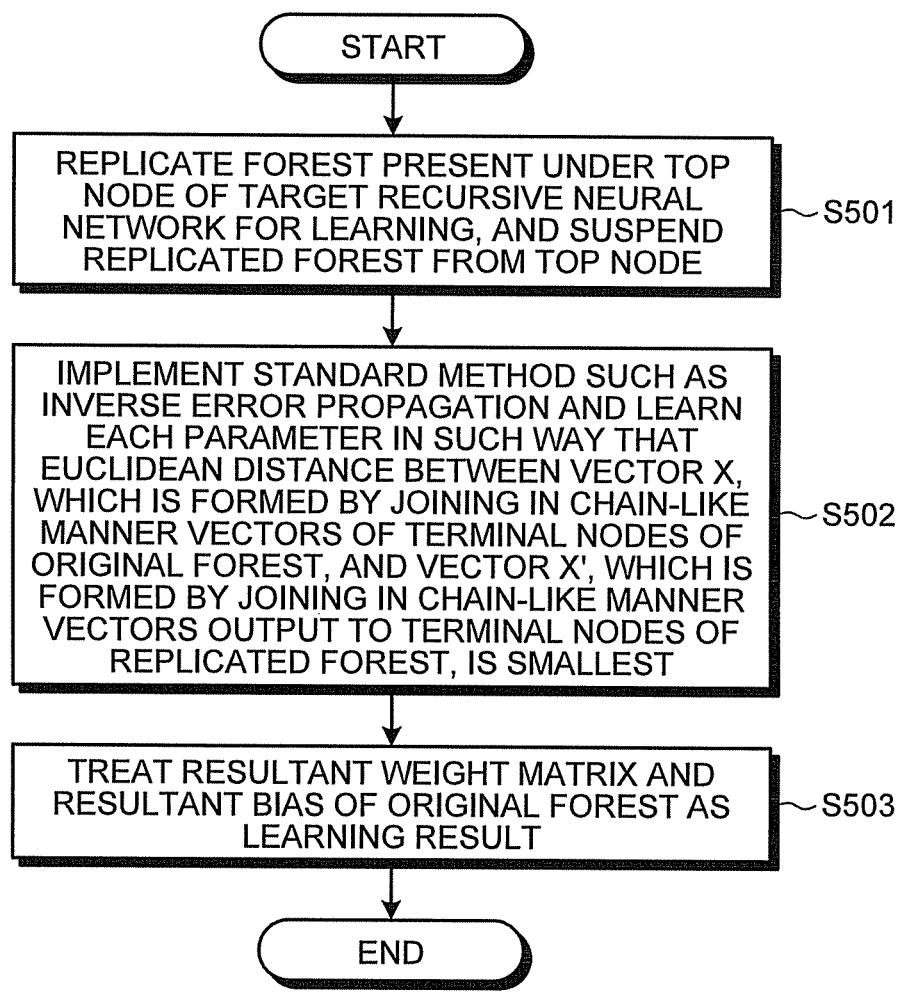
FIG. 17 is a flowchart for explaining an exemplary sequence of operations performed during a learning operation for learning various parameters.

FIG. 17 is a flowchart for explaining an exemplary sequence of operations performed during a learning operation for learning various parameters. The context vector generator 15 of the semantic analysis engine 10A performs operations from Steps S501 to S503, and learns various parameters of MV-RNN.

Step S501: The context vector generator 15 replicates the forest present under the top node of the target recursive neural network for learning, and suspends the replicated forest from the top node. Herein, regarding the replicated forest, the weight matrix (in FIG. 16, written as $W_d$) and the bias (not written in FIG. 16) are treated as different variables than the weight matrix (in FIG. 16, written as $W_e$) and the bias (not written in FIG. 16) of the original forest.

Step S502: the context vector generator 15 implements a standard method such as inverse error propagation and learns each parameter in such a way that the Euclidean distance between a vector X, which is formed by joining in a chain-like manner the vectors of terminal nodes of the original forest, and a vector X', which is formed by joining in a chain-like manner the vectors output to the terminal nodes of the replicated forest, is the smallest. Herein, as training data, an arbitrary text group that has been subjected to syntactic analysis is used.

Step: S503: the context vector generator 15 treats the resultant weight matrix (in FIG. 16, written as $W_e$) and the resultant bias (not written in FIG. 16) of the original forest as the learning result. That marks the end of the operations.

Figure 18:
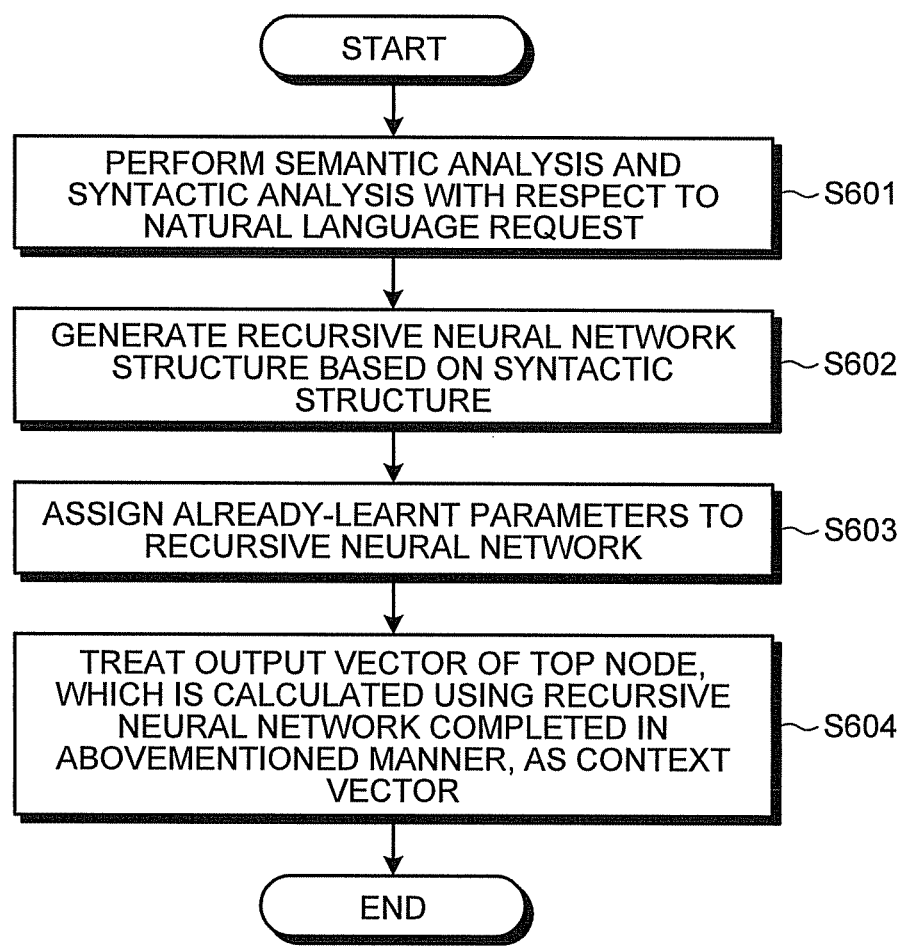
FIG. 18 is a flowchart for explaining an exemplary sequence of operations for generating a context vector.

Given below is the explanation of an operation for generating the context vector D6 using MV-RNN. FIG. 18 is a flowchart for explaining an exemplary sequence of operations for generating the context vector D6. The morphological analyzer/syntactic analyzer 14 of the semantic analysis engine 10A performs operations from Steps S601 to S604, and generate the context vector D6 from the natural language request D1.

Step S601: the morphological analyzer/syntactic analyzer 14 performs semantic analysis and syntactic analysis with respect to the natural language request D1.

Step S602: the context vector generator 15 generates a recursive neural network structure based on the syntactic structure obtained as a result obtained at Step S601.

Step S603: the context vector generator 15 assigns, to the recursive neural network, the already-learnt parameters obtained according to the sequence of operations illustrated in the flowchart in FIG. 17.

Step S604: the context vector generator 15 treats the output vector of the top node, which is calculated using the recursive neural network completed in the abovementioned manner, as the context vector D6. That marks the end of the operations.

During the operations performed by the ranker 22A of the context-recognition-type recommendation engine 20A, the context vector D6 generated by the context vector generator 15 is incorporated in the feature vector $f_i$ (the (visible) feature vector extracted in relation to the user i and the context tag in the natural language request D1). Aside from changes in the values, the operations performed by the ranker 22 of the context-recognition-type recommendation engine 20A are identical to the operations performed by the ranker 22 according to the first embodiment. Meanwhile, in the explanation of Equations (1) and (2) given above, the portion written as "context tag" can be substituted by "context vector".

As described above in detail with reference to specific examples, in the item recommendation device according to the second embodiment, in an identical manner to the item recommendation device according to the first embodiment, it becomes possible to recommend items with more accuracy using not only the context information observable from outside but also the inner information estimated from the natural language request D1.

Moreover, in the item recommendation device according to the second embodiment, the inner information can be estimated from the natural language request D1 without having to generate in advance the rules such as the context tag dictionary 102. Hence, effective item recommendation can be done in response to a wide range of user needs.

Meanwhile, in the second embodiment, the configuration is such that the candidate extractor 21 narrows down the stores representing candidate items using the search tag group D2, and then the ranker 22A performs ranking with respect to the candidate item group D3. However, that is not the only possible case. Alternatively, for example, the configuration can be such that the ranker 22A narrows down the candidate items using the search tag group D2 as well as performs ranking. Still alternatively, the configuration can be such that the ranker 22A firstly performs ranking, and then the candidate items are narrowed down based on the search tag group D2.

Third Embodiment

Given below is the explanation of an item recommendation device according to a third embodiment. In addition to having the functions of the item recommendation device according to the first embodiment, the item recommendation device according to the third embodiment has a function of further receiving input of an image in which a group of persons is captured and integrating human relationship tags, which are estimated based on the received image, into the context tag group generated from the natural language request D1. Then, the item recommendation device according to the third embodiment ranks the recommended items by referring to the context tag group into which the human relationship tags are integrated. Moreover, the item recommendation device according to the third embodiment performs image recognition and selects a person estimated to be the key person (the central character) from the group of persons, and uses the attributes of the selected person in place of the user information stored in the user DB 104. As a result, the user DB 104 becomes applicable in an application that cannot be provided in advance, and items according to the human relationships can be recommended. Meanwhile, the addition of such functions can also be done in the item recommended device according to the second embodiment. In that case, for example, information equivalent to the human relationship tags is incorporated as part of the dimensions of the context vector.

The item recommendation device according to the third embodiment is effective for use in item recommendation using interactive direction boards installed in the town. For example, consider a case in which a group of persons uses a direction board to search for nearby restaurants. The key person of the group issues a natural language request using voice with respect to the direction board. At that time, a camera embedded in the direction board captures the group of persons, and the image is analyzed (subjected to image recognition) to generate human relationship tags indicating the human relationships in the group. Then, the human relationship tags are used in ranking the recommended items. As a result, if the group represents a family, then family-oriented restaurants can be recommended. Similarly, if the group represents a couple, then couple-oriented restaurants can be selected. Moreover, from the image in which a group of persons is captured, the attributes of the key person can be used in place of the user information. Hence, in the case in which many and unspecified people are expected to use the direction boards installed in the town, even when the user DB 104 cannot be prepared in advance, item recommendation can be performed with high accuracy.

Figure 19:
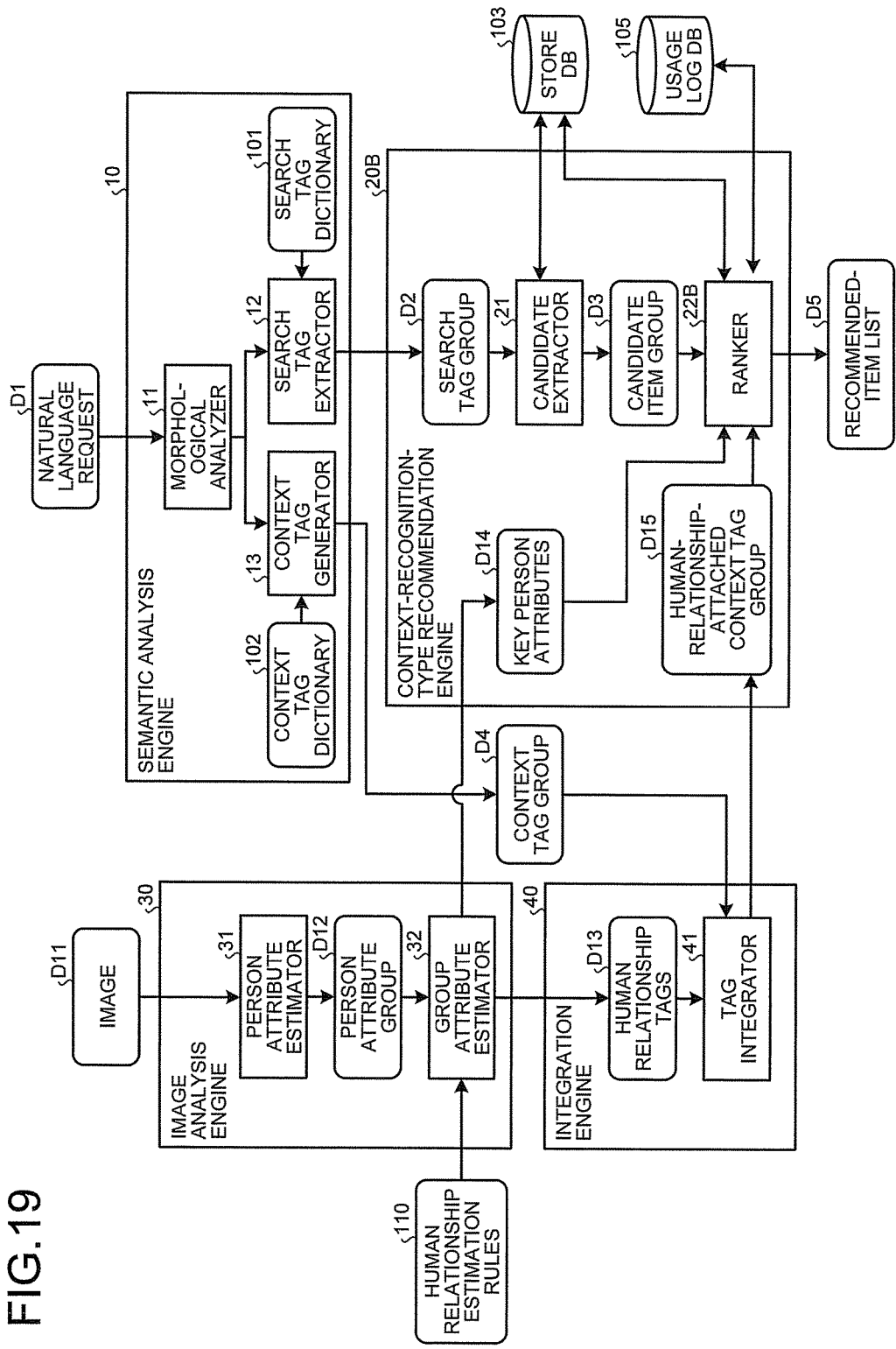
FIG. 19 is a block diagram illustrating a configuration example of an item recommendation device according to a third embodiment.

Explained below are the differences with the first embodiment. FIG. 19 is a block diagram illustrating a configuration example of the item recommendation device according to the third embodiment. As illustrated in FIG. 19, in the item recommendation device according to the third embodiment, the context-recognition-type recommendation engine 20 according to the first embodiment is replaced with a context-recognition-type recommendation engine 20B. Moreover, the item recommendation device according to the third embodiment also includes an image analysis engine 30 (a human relationship information generator) and an integration engine 40 (an integrating unit). Meanwhile, the user DB 104 that is used in ranking the candidate items in the first embodiment is not maintained in the third embodiment.

In the context-recognition-type recommendation engine 20B, the ranker 22 explained in the first embodiment is replaced with a ranker 22B, which refers to a human-relationship-attached context tag group D15 instead of referring to the context tag group D4 according to the first embodiment, which refers to key person attributes D14 instead of referring to the usage information extracted from the usage log DB 105, but which performs the learning operation and the estimation operation in an identical manner to the ranker 22 according to the first embodiment.

The image analysis engine 30 receives input of an image D11 in which a group of persons is captured, and generates a person attribute group D12 by performing a known type of image recognition with respect to the image D11. The person attribute group D12 represents a set of attributes of each person detected from the image D11. Moreover, the image analysis engine 30 collates the person attribute group D12 with predetermined human relationship estimation rules 110, and generates and outputs human relationship tags D13 (human relationship information). Furthermore, the image analysis engine 30 selects a person estimated to be the key person (the central character) of the group from the persons detected in the image D11, and outputs the attributes of the selected person as the key person attributes D14. With the aim of implementing such functions, the image analysis engine 30 includes a person attribute estimator 31 and a group attribute estimator 32.

The integration engine 40 receives input of the context tag group D4 that is generated by the semantic analysis engine 10, and the human relationship tags D13 that are generated by the image analysis engine 30; integrates the human relationship tags D13 into the context tag group D4; and generates and outputs the human-relationship-attached context tag group D15. The integration engine 40 includes a tag integrator 41 for the purpose of generating the human-relationship-attached context tag group D15.

Given below is the explanation of a specific example of the operations performed by the person attribute estimator 31, the group attribute estimator 32, and the tag integrator 41.

Figure 20:
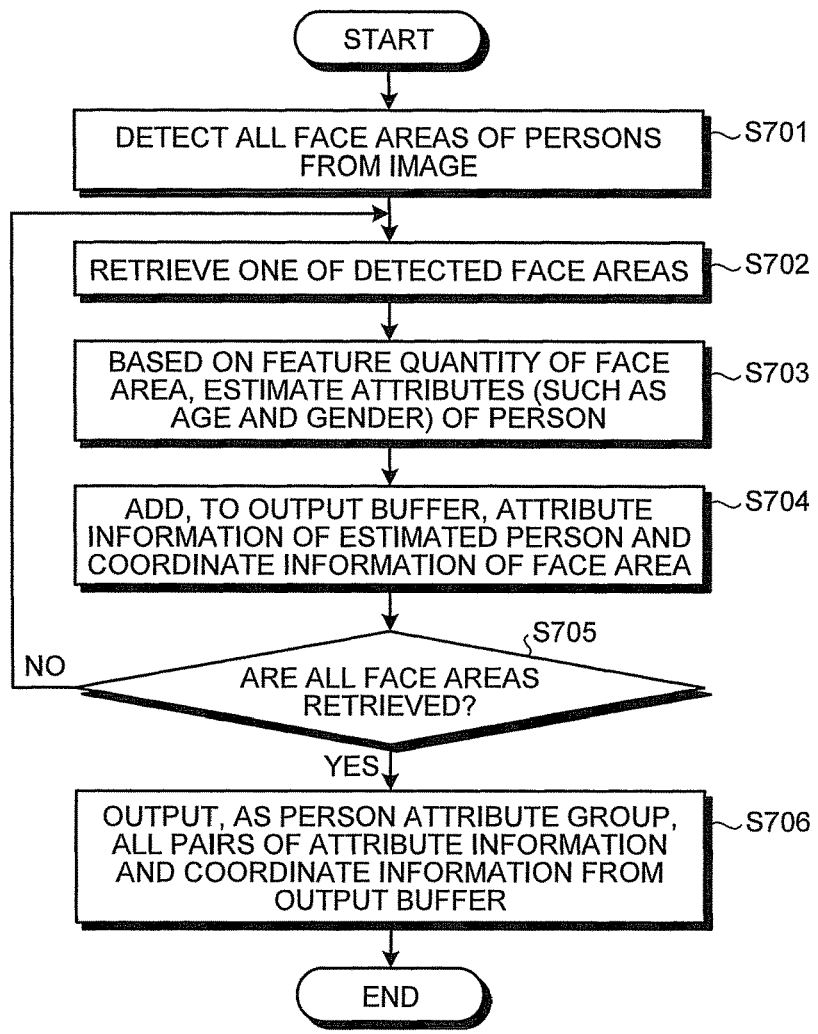
FIG. 20 is a flowchart for explaining an exemplary sequence of operations performed by a person attribute estimator.

Firstly, the explanation is given about the person attribute estimator 31. FIG. 20 is a flowchart for explaining an exemplary sequence of operations performed by the person attribute estimator 31. Herein, the person attribute estimator 31 includes an image recognizer and, for example, performs operations from Steps S701 to S706 and generates and outputs the person attribute group D12 from the image D11.

Step S701: the person attribute estimator 31 detects all face areas of the persons from the image D11. The technology for detecting face areas of persons from an image is a known technology. Hence, the relevant explanation is not given herein.

Step S702: the person attribute estimator 31 retrieves one of the face areas detected at Step S701.

Step S703: based on the feature quantity of the face area retrieved at Step S702, the person attribute estimator 31 estimates the attributes (such as the age and the gender) of the person. Herein, the single digits of the estimated age are truncated and information such as 0 (below 10 years), 10 (between 10 to 19 years), 20 (between 20 to 29 years), and so on is output. In the following explanation, such information is called age period. As the technique of estimating the age of a person from the feature quantity of face area, it is possible to implement the technology disclosed in Japanese Patent Application Laid-open No. 2014-153815, for example. Meanwhile, herein, although it is assumed that the age and the gender are estimated as the attributes of a person, it is also possible to use various other attributes other than the age and the gender as disclosed in Japanese Patent Application Laid-open No. 2012-3623, for example.

Step S704: the person attribute estimator 31 adds, to the output buffer, attribute information of the person as estimated at Step S703 and coordinate information of the face area retrieved at Step S702.

Step S705: the person attribute estimator 31 determines whether or not all face areas detected from the image D11 have been retrieved. If all face areas have been retrieved (Yes at Step S705), the system control proceeds to Step S706. However, if all face areas have not been retrieved (No at Step S705), then the system control returns to Step S702.

Step S706: the person attribute estimator 31 outputs, as the person attribute group D12, all pairs of the attribute information and the coordinate information that are stored in the output buffer.

Given below is the explanation of the group attribute estimator 32. Herein, the group attribute estimator 32 applies the human relationship estimation rules 110 with respect to the human attribute group D12 that has been input; estimates the human relationships between the group of persons captured in the image D11; and generates and outputs the human relationship tags D13 representing the estimated human relationships. Moreover, the group attribute estimator 32 estimates the key person from the group of persons captured in the image D11; retrieves the attribute information of the estimated key person from the person attribute group D12; and outputs the attribute information as the key person attributes D14. The operation by which the group attribute estimator 32 generates and outputs the human relationship tags D13 is called a human relationship estimation operation, and the operation by which the group attribute estimator 32 outputs the key person attributes D14 is called a key person estimation operation. The key person attributes D14 serve as a substitute for the user information retrieved from the user DB 104 in the first embodiment.

Firstly, the explanation is given about the human relationship estimation operation. Given below is an example of the human relationship estimation rules 110 used in the human relationship estimation operation. The left side of arrows indicates matching rules, and the right side of arrows indicates the human relationship tags D13.

A person below 10 years is present→accompanied by a child

A man and a woman 20 years of age and older are present and have the age difference equal to or smaller than 20 years→a couple A man and a woman 30 years of age and older are accompanied by a person below 10 years→family In the human relationship estimation operation, such predetermined human relationship estimation rules 110 are sequentially applied with respect to the person attribute group D12. When a match is found, the corresponding human relationship tag D13 is output. Thus, only one of the human relationship tags D13 is output.

Given below is the explanation of the key person estimation operation. In the third embodiment, the person having the largest face area detected from the image D11 is estimated to be the key person. More particularly, the sizes of the face areas are determined from the coordinate information of the face areas included in the person attribute group D12, and the person having the largest face area is selected as the key person. Alternatively, the person having the face area detected to be closest to the center of the image D11 can be estimated to be the key person. In that case, the positions of the face areas are determined from the coordinate information of the face areas included in the person attribute group D12, and the person having the face area positioned closest to the center of the image D11 is selected as the key person. Then, the attributes (such as age and gender) of the key person are output as the key person attributes D14.

Meanwhile, as in the case of an interactive direction board, in an application example in which the natural language request D1 is input using voice, a method can be implemented in which the person who is detected to have spoken based on dynamic state/still state determination regarding the lip area is considered to be the key person. The dynamic state/still state determination regarding the lip area can be performed according to the method explained in Reference Literature 4 mentioned below. A reference image is provided for each instance of opening of the mouth; and the AdaBoost method using the Haar-Like feature is implemented with respect to each frame of the face areas detected from the image D11, and the lip area is detected. Then, with respect to the lip area in each frame, the manner of opening the mouth is identified based on the reference images. When there is a difference in the manner of opening the mouth across frames, then it is determined that the lip area has moved.

(Reference Literature 4) H. Kai, D. Miyazaki, R. Furukawa, M. Aoyama, S. Hiura, and N. Asada: "Speech Detection from Extraction and Recognition of Lip Area", Research Paper, Information Processing Society of Japan, Vol. 2011-CVIM-177, No. 13, pp. 1-8(2011)

Given below is the explanation of the tag integrator 41. Herein, the tag integrator 41 generates the human-relationship-attached context tag group D15 by integrating the context tag group D4 explained in the first embodiment and the human relationship tags D13. More specifically, the tag integrator 41 incorporates the human relationship tags D13 as part of the context tag group D4, and generates the human-relationship-attached context tag group D15. For example, as illustrated in FIG. 7, the context tag group D4 includes tags related to scenes, tags related to accompanying persons, tags related to objectives, tags related to situations, and tags related to timeslots. The tag integrator 41 incorporates the human relationship tags D13 as the tags related to accompanying persons, and generates the human-relationship-attached context tag group D15. However, if the context tag group D4 already includes tags related to accompanying persons, then it is desirable to give priority to those tags without incorporating the human relationship tags D13. That is because giving priority to the context that is explicitly demanded by the user is believed to be the natural solution.

The ranker 22B of the context-recognition-type recommendation engine 20B refers to the human-relationship-attached context tag group D15 for the purpose of ranking the recommended items. The ranker 22B receives input of the human-relationship-attached context tag group D15 in place of the context tag group D4 and receives input of the key person attribute D14 in place of the user information extracted from the user DB 104; and ranks the recommended items by performing an identical operation to the first embodiment. Meanwhile, in the context tag column of the usage log DB 105, the human-relationship-attached context tag group D15 is used in place of the context tag group D4.

As described above in detail with reference to specific examples, in the item recommendation device according to the third embodiment, in an identical manner to the item recommendation device according to the first embodiment, it becomes possible to recommend items with more accuracy using not only the context information observable from outside but also the inner information estimated from the natural language request D1 and the image D11.

Moreover, in the item recommendation device according to the third embodiment, even when the user DB 104 cannot be prepared in advance because of the fact that many and unspecified people are the users, making use of the key person attribute D14 in place of the user information extracted from the user DB 104 enables performing item recommendation with high accuracy in an identical manner to the first embodiment.

Supplementary Explanation

Figure 21:
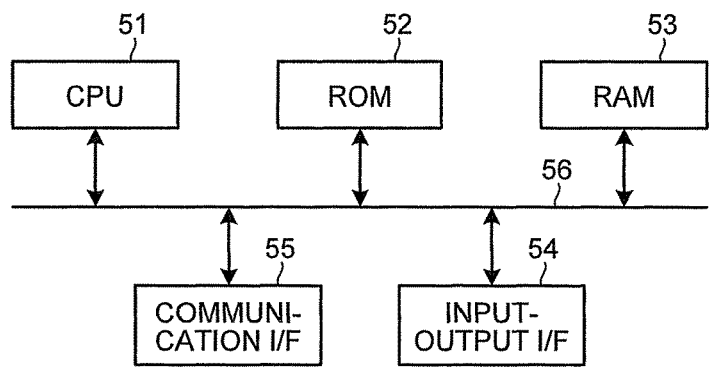
FIG. 21 is a block diagram that schematically illustrates an exemplary hardware configuration of the item recommendation device.

The processing units of the item recommendation device according to the embodiments (i.e., the morphological analyzer 11, the search tag extractor 12, the context tag generator 13, the candidate extractor 21, and the ranker 22 according to the first embodiment) can be implemented either using hardware or using software (computer programs) running in coordination with hardware. In the case of implementing the processing units using software, for example, as illustrated in FIG. 21, the item recommendation can have the hardware configuration of a commonly-used computer that includes a processor circuit such as a central processing unit (CPU) 51, memory devices such as a read only memory (ROM) 52 and a random access memory (RAM) 53, an input-output interface (I/F) 54 to which a display panel or various operating devices are connected, a communication I/F 55 that performs communication by establishing connection with a network, and a bus 56 that interconnects the constituent elements.

The computer programs executed in the item recommendation device according to the embodiments are recorded as installable or executable files in a computer-readable recording medium such as a compact disk read only memory (CD-ROM), a flexible disk (FD), a compact disk recordable (CD-R), or a digital versatile disc (DVD); and are provided in the form of a computer program product.

Alternatively, the computer programs executed in the item recommendation device according to the embodiments can be saved as downloadable files on a computer connected to a network such as the Internet or can be made available for distribution through a network such as the Internet. Still alternatively, the computer programs executed in the item recommendation device according to the embodiments can be stored in advance in the ROM 52.

The computer programs executed in the item recommendation device according to the embodiments contain modules for the processing units of the item recommendation device according to the embodiments (i.e., the morphological analyzer 11, the search tag extractor 12, the context tag generator 13, the candidate extractor 21, and the ranker 22 according to the first embodiment). As the actual hardware, for example, the CPU 51 (a processor) reads the computer programs from a recording medium and executes them. As a result, the processing units are loaded and generated in the RAM 53 (a main memory). Meanwhile, some or all of the processing units of the item recommendation device according to the embodiments can be alternatively implemented using dedicated hardware such as an application specific integrated circuit (ASIC) or a (field-programmable gate array (FPGA).

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An item recommendation device comprising:
processing circuitry configured to function as:
a search information generator that generates search information by performing semantic analysis on a natural language request which is input;
a candidate extractor that performs searching with respect to a storing unit storing therein item information using the generated search information, and extracts candidates of items to be presented to a user;
a context information generator that generates and outputs context information including user intention by performing semantic analysis on the natural language request;
a ranker that ranks the extracted candidates of items based on the generated context information, user information representing an attribute of the user, and history information representing item usage history of the user; and
a context tag dictionary that stores therein a plurality of context tags, each context tag of the plurality of context tags representing a context and stored in association with at least one word or phrase acting as a trigger for generating the each context tag, wherein
when a word or phrase extracted from the natural language request matches with a context tag stored in the context tag dictionary, the context information generator outputs the context tag as the generated context information, when the word or phrase extracted from the natural language request matches with a word or phrase stored in the context tag dictionary, the context information generator outputs a corresponding context tag stored in the context tag dictionary, as the generated context information, the history information includes the context information that is used for ranking, when an item has been extracted as a candidate, the item that has been used, and the ranking unit generates a first feature vector related to the user and the generated context information based on the attribute of the user and the context information included in the history information, generates a second feature vector related to items based on attributes of the items, calculates rating estimation values of the extracted candidates of items using an equation to which the first feature vector and the second feature vector are applied, sorts the extracted candidates of items in a descending order of rating estimation value, and outputs the sorted candidates of items, and the plurality of context tags include tags related to scenes, tags related to accompanying persons, tags related to objectives, tags related to situations, and tags related to timeslots.

2. The device according to claim 1, further comprising a search tag dictionary that stores therein a plurality of search tags, each search tag of the plurality of search tags serving as a search keyword and stored in association with at least one word or phrase acting as a trigger for generating the each search tag, and an application destination attribute representing an attribute to which the search tag is applied, wherein when a word or phrase extracted from the natural language request matches with a search tag stored in the search tag dictionary, the search information generator outputs the search tag and a corresponding application destination attribute stored in the search tag dictionary, as the generated search information, and when the word or phrase extracted from the natural language request matches with a word or phrase stored in the search tag dictionary, the search information generator outputs a corresponding search tag and a corresponding application destination attribute stored in the search tag dictionary, as the generated search information.

3. The device according to claim 1, wherein the processing circuitry is further configured to function as:

a human relationship information generator that analyzes an image which is input, and generates and outputs human relationship information which represents human relationship in a group of persons included in the image; and an integrating unit that integrates the human relationship information into the generated context information, wherein the ranker ranks the extracted candidates of items based on the generated context information into which the human relationship information has been integrated, the user information, and the history information.

4. The device according to claim 3, wherein the human relationship information generator detects persons from the image and estimates an attribute of each of the persons, and collates a set of attributes of the persons detected from the image with a predetermined rule and generates the human relationship information.

5. The device according to claim 4, wherein from among persons detected from the image, the human relationship information generator selects a person having a largest size in the image, or selects a person detected to be closest to a center of the image, or selects a person whose lip area is moving, and the ranker uses the attribute of the person, who is selected by the human relationship information generator, as the user information.

6. An item recommendation method implemented in an item recommendation device, comprising:

generating search information by performing semantic analysis on a natural language request which is input;

performing searching with respect to a storing unit storing therein item information using the search information and extracting candidates of items to be presented to a user;

generating and outputting context information including user intention by performing semantic analysis on the natural language request;

ranking the extracted candidates of items based on the generated context information, user information representing an attribute of the user, and history information representing item usage history of the user;

storing in a context tag dictionary a plurality of context tags, each context tag of the plurality of context tags representing a context and stored in association with at least one word or phrase acting as a trigger for generating the each context tag;

when a word or phrase extracted from the natural language request matches with a context tag stored in the context tag dictionary, outputting the context tag as the generated context information; and when the word or phrase extracted from the natural language request matches with a word or phrase stored in the context tag dictionary, outputting a corresponding context tag stored in the context tag dictionary, as the generated context information, wherein the history information includes the context information that is used for ranking, when an item has been extracted as a candidate, the item that has been used, and further comprising generating a first feature vector related to the user and the generated context information based on the attribute of the user and the context information included in the history information, generating a second feature vector related to items based on attributes of the items, calculating rating estimation values of the extracted candidates of items using an equation to which the first feature vector and the second feature vector are applied, sorting the extracted candidates of items in a descending order of rating estimation value, and outputting the sorted candidates of items, and the plurality of context tags include tags related to scenes, tags related to accompanying persons, tags related to objectives, tags related to situations, and tags related to timeslots.

7. A computer program product comprising a non-transitory computer readable medium including programmed instructions for item recommendation, wherein the instructions, when executed by a computer, cause the computer to perform:
  generating search information by performing semantic analysis on a natural language request which is input;
  performing searching with respect to a storing unit storing therein item information using the generated search information and extracting candidates of items to be presented to a user;
  generating and outputting context information including user intention by performing semantic analysis on the natural language request;
  ranking the extracted candidates of items based on the generated context information, user information representing an attribute of the user, and history information representing item usage history of the user;
  storing in a context tag dictionary a plurality of context tags, each context tag of the plurality of context tags representing a context and stored in association with at least one word or phrase acting as a trigger for generating the each context tag;
  when a word or phrase extracted from the natural language request matches with a context tag stored in the context tag dictionary, outputting the context tag as the generated context information; and
  when the word or phrase extracted from the natural language request matches with a word or phrase stored in the context tag dictionary, outputting a corresponding context tag stored in the context tag dictionary, as the generated context information, wherein
  the history information includes the context information that is used for ranking, when an item has been extracted as a candidate, the item that has been used, and further comprising
  generating a first feature vector related to the user and the generated context information based on the attribute of the user and the context information included in the history information,
  generating a second feature vector related to items based on attributes of the items,
  calculating rating estimation values of the extracted candidates of items using an equation to which the first feature vector and the second feature vector are applied,
  sorting the extracted candidates of items in a descending order of rating estimation value, and
  outputting the sorted candidates of items, and
  the plurality of context tags include tags related to scenes, tags related to accompanying persons, tags related to objectives, tags related to situations, and tags related to timeslots.

* * * * *